United States Patent
Piche et al.

(10) Patent No.: US 10,626,817 B1
(45) Date of Patent: Apr. 21, 2020

(54) CONTROL AND TUNING OF GAS TURBINE COMBUSTION

(71) Applicant: General Electric Company, Schenectady, NY (US)

(72) Inventors: Stephen William Piche, Austin, TX (US); Fred Francis Pickard, Norfolk, MA (US); Robert Nicholas Petro, Austin, TX (US); Yan Liu, Grafton, MA (US); Nurali Virani, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 16/144,548

(22) Filed: Sep. 27, 2018

(51) Int. Cl.
*F02D 41/14* (2006.01)
*F02C 9/26* (2006.01)

(52) U.S. Cl.
CPC ............ *F02D 41/1405* (2013.01); *F02C 9/26* (2013.01); *F02D 41/1453* (2013.01); *F02D 41/1461* (2013.01); *F02D 2200/0606* (2013.01); *F02D 2250/36* (2013.01); *F05D 2270/082* (2013.01); *F05D 2270/0831* (2013.01); *F05D 2270/709* (2013.01)

(58) Field of Classification Search
CPC .............. F02D 41/1405; F02D 41/1461; F02D 41/1453; F02D 2200/0606; F02D 2250/36; F02C 9/26; F05D 2270/082; F05D 2270/0831; F05D 2270/709; G06N 3/08
See application file for complete search history.

(56) References Cited

U.S. PATENT DOCUMENTS

| 5,212,765 A | * | 5/1993 | Skeirik | G05B 13/027 417/44.2 |
| 6,665,651 B2 | * | 12/2003 | Young | G05B 13/027 706/16 |

(Continued)

FOREIGN PATENT DOCUMENTS

DE        10345440 A1    5/2005

OTHER PUBLICATIONS

EP Search Report and Written Opinion for corresponding EP Application No. 19199706 dated Jan. 31, 2020, 7 pages.

*Primary Examiner* — Christopher E. Everett
(74) *Attorney, Agent, or Firm* — James Pemrick; Hoffman Warnick LLC

(57) ABSTRACT

A system that includes: a gas turbine having a combustion system; a control system operably connected to the gas turbine for controlling an operation thereof; and a combustion auto-tuner, which is communicatively linked to the control system, that includes an optimization system having an empirical model of the combustion system and an optimizer; sensors configured to measure the inputs and outputs of the combustion system; a hardware processor; and machine-readable storage medium on which is stored instructions that cause the hardware processor to execute a tuning process for tuning the operation of the combustion system. The tuning process includes the steps of: receiving current measurements from the sensors for the inputs and outputs; given the current measurements received from the sensors, using the optimization system to calculate an optimized control solution for the combustion system; and communicating the optimized control solution to the control system.

17 Claims, 16 Drawing Sheets

(56) References Cited

U.S. PATENT DOCUMENTS

| | | | |
|---|---|---|---|
| 6,823,675 B2* | 11/2004 | Brunell | F02C 9/00 60/773 |
| 7,123,971 B2 | 10/2006 | Piche | |
| 7,164,954 B2 | 1/2007 | Lefebvre et al. | |
| 7,398,652 B1 | 7/2008 | Kosvic et al. | |
| 7,698,004 B2 | 4/2010 | Boyden et al. | |
| 7,844,351 B2 | 11/2010 | Piche | |
| 7,945,523 B2 | 5/2011 | Hofmann et al. | |
| 7,966,080 B2 | 6/2011 | Jia et al. | |
| 8,644,961 B2 | 2/2014 | Wroblewski et al. | |
| 8,682,635 B2* | 3/2014 | Sayyar-Rodsari | H02J 3/14 703/18 |
| 8,755,916 B2* | 6/2014 | Lou | F23C 9/00 700/272 |
| 10,287,988 B2 | 5/2019 | Asati et al. | |
| 2002/0016665 A1* | 2/2002 | Ulyanov | G05B 13/0285 701/106 |
| 2002/0123864 A1* | 9/2002 | Eryurek | G05B 23/0254 702/188 |
| 2004/0133531 A1* | 7/2004 | Chen | G06K 9/6298 706/8 |
| 2005/0216103 A1* | 9/2005 | Lefebvre | G05B 7/02 700/29 |
| 2006/0100721 A1* | 5/2006 | Piche | G05B 5/01 700/47 |
| 2006/0178762 A1* | 8/2006 | Wroblewski | G05B 13/027 700/30 |
| 2007/0055392 A1* | 3/2007 | D'Amato | G05B 13/048 700/44 |
| 2007/0156288 A1* | 7/2007 | Wroblewski | G05B 13/042 700/266 |
| 2012/0060505 A1* | 3/2012 | Fuller | G05B 13/00 60/773 |
| 2015/0185716 A1* | 7/2015 | Wichmann | F01K 23/101 700/287 |
| 2017/0175645 A1* | 6/2017 | Devarakonda | F01N 3/20 |
| 2017/0308632 A1* | 10/2017 | Hackney | G05B 17/02 |
| 2018/0268288 A1* | 9/2018 | Vandike | F01D 21/003 |
| 2018/0354630 A1* | 12/2018 | Nakhjavani | G06N 3/084 |
| 2018/0356780 A1 | 12/2018 | Halabieh | |

* cited by examiner

CONTROL AND TUNING OF GAS TURBINE COMBUSTION

BACKGROUND OF THE INVENTION

The present invention relates to an automated system to sense the operating conditions within a combustion system of a gas turbine and adjust or tune the combustion system to achieve desired operation or performance.

Industrial combustion or gas turbines are commonly used in many applications, for example, to drive electrical generators in power plants. Many of these gas turbines achieve low emission levels, such as the emission of NOx, by employing lean premixed combustion wherein fuel and an excess of air are mixed prior to combustion to control and limit thermal NOx production. This class of combustion systems or combustors—often referred to as Dry Low NOx combustors, requires careful management of combustion conditions to achieve stable operation and acceptable NOx and CO emissions, while also remaining free of pressure oscillations—called "combustor dynamics" or, simply, "dynamics"—which usually include a combination of acoustics and unsteady energy release during the combustion process. Such systems often require multiple independently controlled fuel injection points supplied by multiple fuel circuits or fuel nozzles in each of one or more parallel combustors in order to achieve desirable combustion performance over the range of operating modes, for example, between start-up and full load. Although these combustion systems have shown to be a great benefit from a standpoint of emissions, the operational envelope of the systems is substantially reduced when compared to more conventional combustion systems. Consequently, the control of fuel conditions and delivery, such as how the fuel is distributed and injected into the combustion zones by the various nozzles—also known as "fuel splits"—have become critical operating parameters and, generally, require frequent adjustment, when, for example, ambient atmospheric conditions, such as temperature, humidity and pressure, change, the gas turbine degrades with usage, fuel composition changes, or other variables are introduced. The adjustment of the combustion fuel conditions, distribution and injection to account for these changes is termed "combustion tuning" or, simply, "tuning".

Controlled operation of a combustion system generally employs a manual setting of the operational parameters related to a gas turbine's combustion system at several expected or standard operational conditions. Such adjustment or tuning of the combustion system generally requires technicians and specialized instrumentation and takes a day or longer to accomplish. Nevertheless, while the arrived at settings may prove satisfactory at the time of setup, changing conditions—such as, for example, changes in ambient conditions, changes in the condition of the equipment, and unexpected operating conditions—may produce unacceptable performance in a matter of days or weeks, which may necessitate another costly manual tuning. Some of these conventional approaches may employ algorithms and/or physics-based models to predict emissions and other outputs based on current gas turbine operating parameters and, from this, select or modify set points, for example, related to fuel distribution or overall fuel/air ratio. These approaches, however, fail to take advantage of real-time data related to combustor dynamics and emissions, which results in the predictions producing control solutions that lead to increased dynamics and unanticipated emissions excursions within the combustion system. The pressure pulsations related to such dynamics can have sufficient force to harm or degrade the combustion system and dramatically reduce the life of combustion hardware, while such emission excursions can lead to costly permit violations.

Therefore, systems and methods that promote combustion stability, decreased dynamics, and/or improved emission levels remains a technical area of need and high interest within the industry. Moreover, systems and methods that operate by utilizing near real-time data, taken from the turbine sensors, to adjust fuel splits, fuel temperature, overall fuel/air ratio, and/or other variables in order to optimize combustion system performance would have significant value.

BRIEF DESCRIPTION OF THE INVENTION

The present application thus describes a system that includes: a gas turbine having a combustion system; a control system operably connected to the gas turbine for controlling an operation thereof; and a combustion auto-tuner, which is communicatively linked to the control system, that includes an optimization system having an empirical model of the combustion system and an optimizer; sensors configured to measure the inputs and outputs of the combustion system; a hardware processor; and machine-readable storage medium on which is stored instructions that cause the hardware processor to execute a tuning process for tuning the operation of the combustion system. The tuning process includes the steps of: receiving current measurements from the sensors for the inputs and outputs; given the current measurements received from the sensors, using the optimization system to calculate an optimized control solution for the combustion system; and communicating the optimized control solution to the control system.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Example embodiments will be described more fully hereinafter with reference to the accompanying drawings, in which some, but not all embodiments are shown. Indeed, embodiments of the present disclosure may take many different forms and should not be construed as limited to the embodiments set forth herein. Like numbers may refer to like elements throughout.

Figure 1:
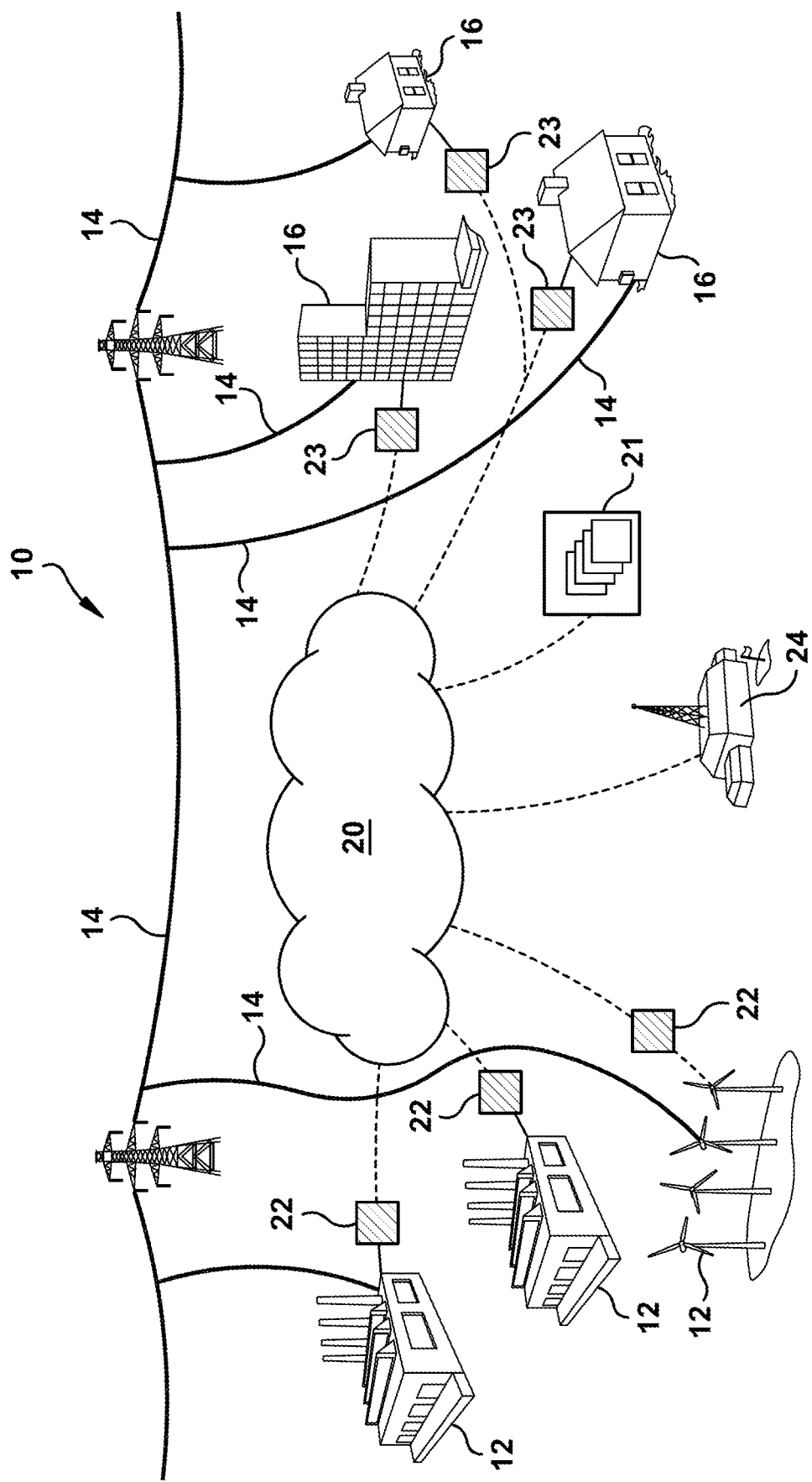
FIG. 1 shows a schematic diagram of a power system according to aspects of the present disclosure or within which embodiments of the present disclosure may be used.

FIG. 1 illustrates a schematic representation of a power system 10 illustrating an exemplary power system environment within which embodiments of the present disclosure may operate. Power system 10 includes several power plants 12 for generating electrical power. Such power plants 10 may include wind and thermal power plants 12, as shown, but also may include other types of power plants, for example, solar power, hydroelectric, geothermal, or nuclear power plants. Within power system 10, common transmission lines 14 connect power plants 12 to one or more loads or customers 16, which, for example, may include municipalities, residential, and industrial customers. Transmission lines 14 represent the distribution network or power grid of power system 10 and may include multiple sections or substations as appropriate.

Power system 10 also includes control systems or controllers that manage or control the operation of several of the components contained therein. For example, a plant controller 22 may control the operation of power plant 12 and the generating units included therewithin, while load controllers 23 may control the manner or timing of power purchases by customers 16. Power system 10 also includes a central authority, or dispatch authority 24, that manages the dispatch process by which load commitments are distributed among power plants 10 for satisfying customer demand. Controllers 22,23 may be connected via communication lines to communication network 20 over which data is exchanged. Communication network 20 may be connected to or part of a communications networks, such as the internet, private networks, or cloud networks. In addition, controllers 22,23 may receive information, data, and instructions from and/or send information, data, and instructions to data libraries and resources (or "data resources 21") through communication network 20. Controllers 22,23 also may store or house data repositories locally. Data resources 21 may include several types of data, including but not limited to market data, operational data, performance data, and ambient conditions data.

In operation, for example, power plants 12 generate electricity that is distributed over common transmission lines 14 for delivery to customers 16. Pursuant to a dispatch process, which is administered by dispatch authority 24, power plants 12 compete against each other to determine how each will be engaged to satisfy the anticipated load requirements of customers 16 during a future generating period. During the dispatch process, operators of power plants 12 generate offer curves that include generating cost for the future generating period. The offer curves represent bids by power plants 12 for the future generating period, and typically include an incremental variable cost curve or some other suitable indication of variable generating expense, which, for example, may be expressed in dollars per megawatt-hour versus output in megawatts. Dispatch authority 24 then uses the received offer curves to divide the anticipate load requirements for the future generating period among power plants 12. For example, dispatch authority 24 may employ a competitive process known as economic dispatch to determine the level at which to engage each power plant 12 that most efficiently satisfies the predicted load requirements of power system 10. In doing this, a primary objective of the dispatch authority 24 is to find the lowest generating cost that satisfies anticipated customer demand. Once this is done, dispatch authority 24 issues a commitment schedule to power plants 12 that specifically describes the manner in which each will be engaged over the future generating period.

Once the commitment schedule is communicated to power plants 12, the objective of each is to generate the committed output in a manner that maximizes economic return. As will be appreciated, given the growing complexity of the modern power plant, this objective is becoming particularly challenging. This complexity is the product of many factors. For example, power plants now typically include many different generating units of varying types, and these enable numerous alternative generating configurations, with each of these alternatives attending its own set of economic considerations. Each of these generating units also must be maintained according to its own maintenance schedule that requires regular outages that must be carefully planned so to not unnecessarily impact plant operations. In addition, the power industry is a heavily regular one, with numerous laws and regulations affecting how power plants can be operated. Finally, of course, fluctuating market conditions make short- and long-term profitability a moving target. While conventional control systems may be proficient at addressing some these issues—for example, executing scheduling algorithms by which fuel flow, inlet guide vanes settings, and other inputs are adjusted—the actual output and efficiency of a power plant is regularly impacted by external factors, such as variable ambient conditions or unplanned outages, that cannot be fully anticipated. As will be appreciated, the growing complexity of power plants and the variability of operating conditions make it difficult to predict and control performance, which often results in inefficient operation. Further, conventional control systems are often inadequate because they do not fully leverage the growing data-intensive aspects of the industrial world. Specifically, current control systems have been unsuccessful at realizing the level of industrial optimization that the growing availability of operational data make possible, and this failure results in power plants and generating units being operated inefficiently and without maximizing economic return.

In addition, performance degradation is another factor that is difficult to quantify, but one that significantly impacts plant operations and economic return. More specifically, because the performance of the generating units and machinery of power plants degrades over time, it must be accounted for when dispatching the units and understood in assessing the cost-effectiveness of the plant. However, the rate at which a gas turbine degrades varies according to many factors, including hours of operation, load, operating configuration, transient operation, and number of starts. Yet many of these factors are interrelated and affect degradation in ways that are not fully understood. As an example, hours-based life in a gas turbine may be prolonged by reducing firing temperatures, however, this alternative reduces efficiency, which increases fuel costs. Conversely, increasing the firing temperature increases efficiency, but shortens component life and increases costs for maintenance and part replacement. In a similar way, decisions related to turn down, shut down, and rapid ramping impact life consumption of machine components and fuel costs. Further, grid compliance and dispatching may be adversely impacted by controlling the plant's generating units in an overly-static manner, i.e., through the use of static control profiles, such as heat rate curves, derived from periodic performance tests. Between such updates, unit performance may have degraded to the point where the control profiles are obsolete.

To compensate for all this variability, power plant operators often become overly conservative in planning for future generating periods, which results in bidding practices that make their units less competitive and underutilized capacity. To do otherwise risks bidding the plant beyond its current performance capabilities, which may force an operator to operate units inefficiently to satisfy load commitments. Thus, because of the many complex and interrelated factors, operators still struggle to manage life cycle costs and economic return associated the generating units of power plants. The extent to which these factors can be better understood and the related trade-offs more effectively balanced can directly translate into improved economic performance of the power plant. That is, without understanding and identifying short-term inefficiencies and long-term deterioration, conventional power plant control systems must rely on being frequently retuned, which can be a costly result, or being bid and operated conservatively, which often negatively impacts the cost-effectiveness of the plant.

Integrated software and hardware-based controllers have long been the preferred solution for driving the operation of industrial assets and machines, such as those within power plant 12. However, with the rise of inexpensive cloud computing, increasing sensor capabilities and decreasing sensor costs, as well as the proliferation of mobile technologies and networking capabilities, new possibilities have arisen to reshape how power plants and generating units are designed, operated, and maintained. For example, recent advances in sensor technologies now enable the harvesting of new types and vastly more operational data, while progress in network speed and capacity allows essentially real-time transmission of this data to distant locations. This means, for example, that even for geographically dispersed fleets of similar assets, data gathered at each remote site can be efficiently brought together, analyzed, and employed in ways aimed at improving both fleet and individual asset performance. As a consequence of this evolving and data-intensive environment, new opportunities arise to enhance or optimize the value of industrial assets through novel industrial-focused hardware and software solutions. However, conventional control systems fail to realize the level of industrial asset optimization made possible by the new types and increased amounts of available operational data.

In sum, these issues generally result in industrial assets, such as power plants and generating units, being operated in ways that fail to maximize efficiency and economic return. With reference now to the following figures, embodiments of the present disclosure will be disclosed that address one or more aspects related to these ongoing problems.

Figure 2:
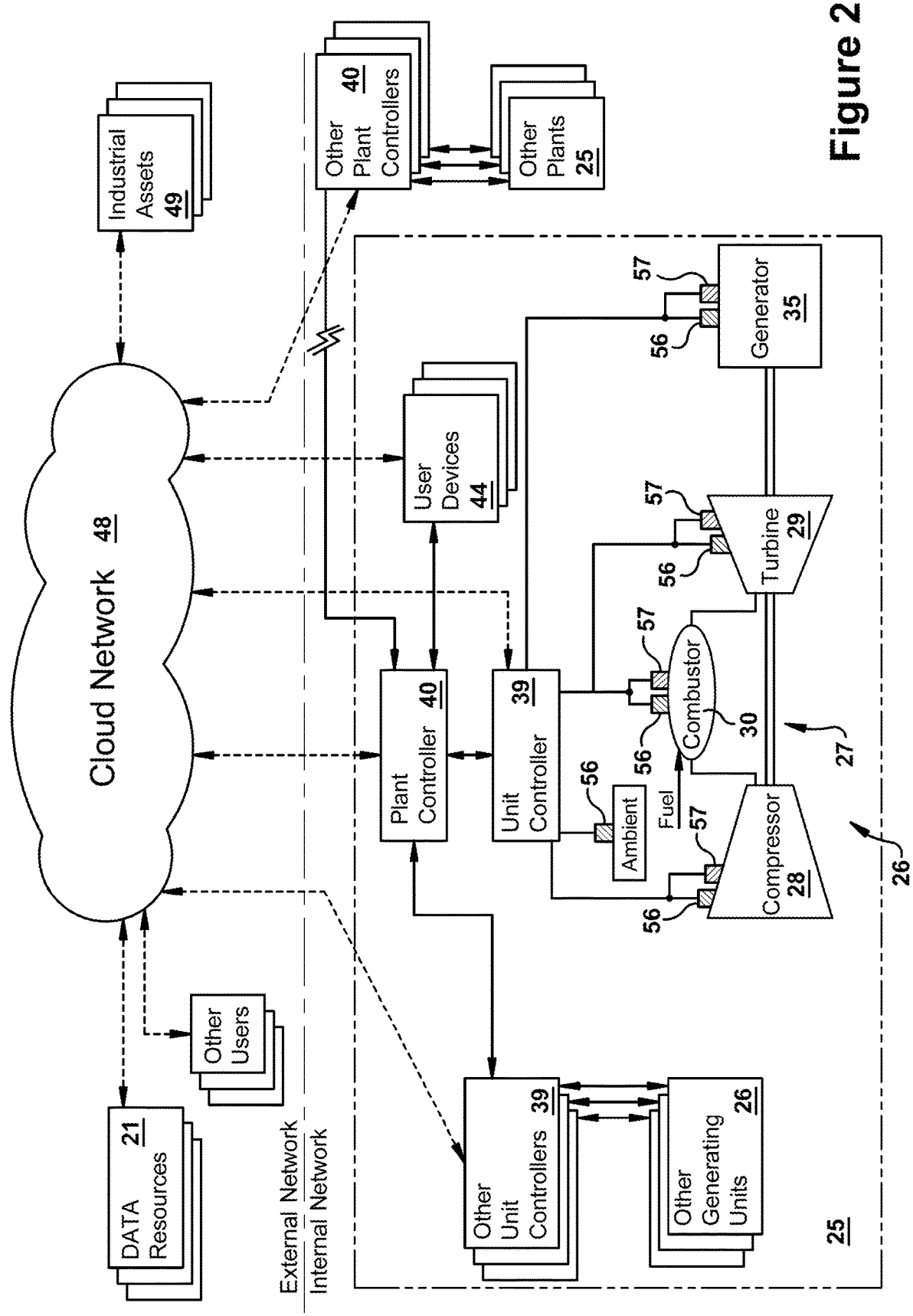
FIG. 2 provides a schematic illustration of an exemplary distributed computing network and power plant having a gas turbine, which includes a computer-implemented control system and network resources in accordance with embodiments of the present application or exemplifying an environment within which such embodiments are enabled or practiced.

FIG. 2 provides a schematic illustration of an exemplary distributed computing system or network within an industrial environment in which an exemplary type of power plant, a power plant 25, has one or more generating units 26. As will be seen, power plant 25 and generating units 26 may be networked via internal and/or external networks to control systems, controllers, and other resources, in accordance with embodiments of the present disclosure or exemplifying a networked industrial environment within which such embodiments are enabled or can be practiced. FIG. 2 also exhibits an exemplary system by which operational data may be collected in relation to any industrial asset, and then analyzed and used for the control and management of that industrial asset. As will be seen, such operational data may be used to create and train empirical models through machine or deep learning processes.

As an exemplary type of generating unit 26, power plant 25 is shown as including a combustion or gas turbine 27, however it should be appreciated that it may include other generating units 26 of varying types. Generating units 26 may be monitored by a variety of sensors that collect and transmit data to local and remote computer systems for analysis thereby, as well as control and operational feedback therefrom. Gas turbine 27 may include a compressor 28 coupled by a common shaft to a downstream turbine section or turbine 29, with a combustor 30 being positioned therebetween. In one example of operation, the rotation of rotor blades within compressor 28 compresses a flow of air. Within combustor 30, energy is released when the compressed air is mixed with a fuel and ignited, with the resulting flow of hot gases, or working fluid, being directed over rotor blades within turbine 29, which induce the shaft to rotate. In this way, the energy within the working fluid is transformed into rotating the shaft, which then, for example, may be used to drive the coils of a generator 35 to produce electricity.

Power plant 25 may include any number of subsystems, components, generating units 26, or industrial assets, each of which may be connected to computer-implemented control systems and communication networks for the control and performance optimization pursuant to analytics, processes, and other functionality described herein. For example, within such control systems, operational data may be collected and provided electronically to computer-implemented analytics, data repositories, plant or unit controllers, cloud-based services, and/or user interfaces or input devices (or "user devices") so to enable a variety of functions. Such functions may include deriving control setpoints for operating an industrial asset, data storage/recall, generating graphical user interfaces, prompting/obtaining user input, decision support for long-term and short-term operations, automated control responses, and others, as may be provided herein. Thus, the networked computing systems, controllers, and related computing resources of FIG. 2 may send/receive electronic communications to/from each of the systems, subsystems, components, sensors, actuators, user devices, and/or other equipment within power plant 25 and included generating units 26, as well as manipulate control settings related thereto, in a manner consistent with functionality described herein, whether that functionality is explicitly stated or implicit given the appended claims, as would be understood by a person of ordinary skill in the art.

As shown, each of the generating units 26 may include a control system or controller (or "unit controller 39"), that monitors and controls operation. Unit controller 39—which, in relation to the control of a gas turbine, may also be referred to as a gas turbine controller or "GT controller"—may fulfill a variety of control requirements as well as protecting against adverse or abnormal operating conditions. For example, unit controller 39 may perform many functions, including fuel, air and emissions control, sequencing of fuel for start-up, shut-down and cool-down, synchronization and voltage matching of generator 35, monitoring gas turbine control and auxiliary functions, and protection against unsafe and adverse operating conditions, as well as other functionality, as may be described or implied herein. A plant controller 40 also may be provided that communicates with each of unit controllers 39. Plant controller 40 generally controls aspects relating to the overall operation of power plant 25. Plant controller 40 may further connect to other plant controllers 40 associated with the operation of other power plants 25, such that multiple power plants 25 within a power plant fleet can communicate, trade information, and be controlled as a group.

Unit controller 39 and plant controller 40—which also may be referenced herein collectively as "controllers"—each may include a computer system having digital processors or processing resources (or "processor") as well as machine-readable storage medium or memory capabilities (or "memory"). Alternatively, unit controller 39 and plant controller 40 may be combined into a single controller having an integrated architecture. Unit controller 39, plant controller 40, and the computer system related to each may connect to one or more user devices 44. Such connections, as illustrated, may be made through internal and/or external networks. User devices 44 may be configured to receive and send communications from/to any personnel associated with the operation of power plant 25 or generating unit 26. User devices 44 may include any conventional device having a user interface, without limitation, including mobile devices, laptops, and other workstations, whether locally or remotely disposed relative to the location of power plant 25 or generating unit 26.

The computer systems related to controllers 39, 40 each may include one or more processors, memory, and other conventional computing componentry, as may be required given any of the functionality described herein. For example, the computer systems of controllers 39, 40 may include non-local aspects distributed throughout the several other resources, devices or nodes depicted in FIG. 2. Such nodes may include, without limitation, a communication network, cloud or cloud-based platform (or, as shown, "cloud network 48" or, more generally, "cloud"); data repositories or other informational resources (or, as shown, "data resources" or "data resources 21"); the several user devices 44; and other unit controllers 39, plant controllers 40, and industrial assets 49, as may be necessary to achieve any of the functionality described herein. It should be understood that the consolidated and localized depiction of controllers 39, 40 in FIG. 1, as well as the computer systems, processors, and memory resources related to each, is merely exemplary and not meant to limit the manner in which any described functionality is executed, unless otherwise stated. Along these lines, it should be further appreciated that reference to unit controller 39, plant controller 40, user devices 44 and/or the computer systems associated with each may include computing resources—such as processing, storage, memory, data and communication devices—which are distributed and accessible via internal or power plant level networks, as well as by cloud network 48, as would be understood by one of ordinary skill in the art given the nature of state of the art distributed computing environments and the functionality described herein, whether that functionality be expressly stated or implied.

Gas turbine 27, as well as any of the other generating units 26, may include multiple sensors 56 that are configured to monitor particular operational aspects of gas turbine 27 by detecting or measuring operating conditions or parameters throughout the engine as it operates. For example, sensors 56 may include temperature sensors, pressure sensors, velocity sensors, flame detector sensors, valve position sensors, as well as any other conventional sensor anticipated given the functionality described herein. As used herein, the term "parameter" refers to measurable physical properties of operation which collectively may be used to define operating conditions within a system. Such operating parameters may include, without limitation, temperature, pressure, humidity, gas flow characteristics, ambient conditions, fuel characteristics, and other measurables, as may be described or implied by the functionality described herein.

Gas turbine 27, as well as any of the other generating units 26, may include several actuators 57 by which control of gas turbine 27 is achieved. For example, actuators 57 may include electro-mechanical devices having variable setpoints or settings that allow for the manipulation of certain process inputs—herein "manipulated variables"—for the control of process outputs herein "controlled variables"—in accordance with a desired result or mode of operation. The control of the manipulated variables via actuators 57 must take into account other non-controllable variables—herein "disturbance variables"—which also affect the operation of gas turbine 27. Thus, for example, commands generated by controllers 39, 40 may cause one or more actuators 57 within gas turbine 27 to adjust valves between a fuel supply and the combustor 30 to regulate flow level, fuel splits, or fuel type.

As will be appreciated, the computer systems of FIG. 2, such as controllers 39, 40, execute code or software programs or applications (or, generally, "software") that are configured to control generating units 26 and/or power plant 25 according to a desired mode of operation or to maximize predefined performance objectives. Such control may be responsive to operational data supplied by sensors 56 and/or instructions received from user devices 44, and such control may be implemented via manipulating one or more actuators 57. In furtherance of this, user devices 44 may be accessed and used by plant managers, technicians, engineers, operators, energy traders, owners, and/or other stakeholders, as may be described or implied by any of the functionality provided herein. The software may include schedules, analytics, models, and algorithms for regulating any of the systems or subsystems described herein.

In general, cloud network 48 includes an external or wide-area network, which connects power plant 25 to other power plants 25, industrial assets 49, and data resources 21. A more secure local area or internal network may also be provided that connects local resources. The connections made between cloud network 48 and any of the other nodes or devices of FIG. 2 may be wired or wireless and/or inclusive of any state of the art communication systems or devices. As will be appreciated, cloud network 48 may be part of a larger communication system or network, including the Internet and/or one or more private computer networks. In this manner, controllers 39, 40 may receive information, data, and instructions from and/or send information, data, and instructions to data resources 21. Connection to such data resources 21 may be made via cloud network 48 or, alternatively, one or more of the data resources 21 may be stored locally and be accessed outside of cloud network 48 via a private or internal network. Additionally, as discussed more below, cloud network 48 may connect gas turbine 27 to other industrial assets 49, such as other remote gas turbines, power plants, or the facilities of suppliers or customers.

Data resources 21 may include any type of data implied by the functionality described herein. For example, data resources 21 may include, but not limited to the following types of data: market data, operational data, and ambient conditions data. Market data, for example, may include information on market conditions, such as energy sales price, fuel costs, labor costs, regulations, etc. Operational data, for example, may include information relating to the operating conditions of power plant 25, gas turbine 27 or related components. Such operational data may include temperature or pressure measurements, air flow rates, fuel flow rates, etc. within gas turbine 27. Ambient condition data, for example, may include information related to ambient conditions at power plant 25, such as ambient air temperature, humidity, and/or pressure. Market, operating, and ambient conditions data each may include historical records, present condition data, and/or data relating to forecasts. For example, data resources 21 may include present and forecast meteorological/climate information, present and forecast market conditions, usage and performance history records about the operation of power plant 25 or gas turbine 27, and/or measured parameters regarding the operation of other similarly situated power plants or gas turbines, which may be defined as those having similar components and/or configurations. Other data, as may be described or implied by the functionality described herein, also may be stored and recalled from data resources 21 as needed.

Thus, according to exemplary embodiments, it should be understood that, while each of controllers 39, 40 may include computer systems having a processor, memory, databases, communication devices, and other computing resources, these resources may be distributed, for example, across any of the several nodes or devices depicted in FIG. 2, including controllers 39, 40, user devices 44, cloud network 48, data resources 21, other industrial assets 49, etc. While certain aspects of controllers 39, 40 may be locally disposed, other aspects may be remote and operationally connected via cloud network 48, as indicated by the dotted lines of FIG. 1. As stated, controllers 39, 40 may be connected, directly or indirectly, to each piece of equipment, subsystem, or component within the power plant, including gas turbine 27 and related subsystems, such that sensors 56 deliver data to the controllers and actuators 57 are responsive to commands received from the controllers. Unless otherwise stated, however, present systems and methods may include embodiments that are not configured to directly control the gas turbine or other generating unit and/or to directly measure operating conditions. In those presently described embodiments that do directly measure/control operation of gas turbine 27 or other generating unit 26, such control may be made pursuant to software or a "control program", which may be stored, in whole or in part, within the memory of the computer systems of unit controller 39 and/or plant controller 40 and, when operated, makes the computer systems thereof manage data and perform the processes, analytics, and logic as provided herein.

According to an exemplary manner of operation, a processor of the computer systems of the controllers executes software or program code (herein "program code") that defines the control program. While executing the program code, the processor processes data, which results in reading and/or writing transformed data from/to memory. Displays on user devices 44 may enable a human user (also "end user" or "operator"), such as any of those described herein, to interact with any of the computer systems using a communications link, such as cloud network 48. As will be appreciated, cloud network 48 may enable the computer system to communicate with any of the other devices described herein, regardless of location. To this extent, the control program of the present disclosure may manage a set of interfaces that enable several users to interact with the control program. Further, the control program, as discussed further below, may manage (e.g., store, retrieve, create, manipulate, organize, present, etc.) data, such as control data or operational data. The controllers may include one or more general purpose computing articles of manufacture capable of executing the program code of the control programs once it is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, the program code may include object code, source code, and/or executable code, and may form part of a computer program product when on computer readable medium. It is understood that the term "computer readable medium" may comprise one or more of any type of tangible medium of expression, now known or later developed, from which a copy of the program code may be perceived, reproduced, or otherwise communicated by a computing device.

As will be appreciated, when the computer executes the program code, it becomes an apparatus for practicing the invention, and on a general-purpose microprocessor, specific logic circuits are created by configuration of the microprocessor with computer code segments. For example, a technical effect of the executable instructions may be to implement a control method and/or system and/or computer program product that uses models to enhance, augment or optimize operating characteristics of industrial assets to improve economic return given a set of constraints, such as ambient conditions, market conditions, performance parameters, life cycle costs, etc. In addition to using current information, historical and/or forecast information may be employed, and a feedback loop may be established to dynamically operate the generating unit and/or power plant more efficiently during fluctuating conditions. The computer code of the control program may be written in computer instructions executable by the computer systems of the controllers. To this extent, the control program executed by the controllers and/or other distributed computer resources may be embodied as any combination of system software and/or application software. Further, the control program may be implemented using a set of modules. In this case, a module may enable the controllers to perform a set of tasks used by control program and may be separately developed and/or implemented apart from other portions of control program. As will be appreciated, when the computer system executing the control program includes multiple computing devices, such as previously described, each computing device may have only a portion of control program or program code fixed thereon.

Thus, generally, the control program may enable computing and digital resources—such as those specifically described herein or which may be generally referred to as a "computer system"—to implement a unit controller or plant controller in accordance with the functionality provided here, particularly those figures to follow that include data flow diagrams, algorithms, methods, analytics, and/or logic. For purposes herein, such a computer system may obtain data via any conventional means. For example, such a computer system may calculate control data for a generating unit or power plant, retrieve control data relating to a generating unit or power plant from one or more data stores, repositories or sources, and/or receive control data for a generating unit or power plant from other systems or devices in or outside of the locality of the generating unit or power plant. In other embodiments, the present application may include methods of providing a copy of the program code, such as for executing the control program, which may include the implementation of some or all the processes described herein. It should be further understood that aspects of the present disclosure may be implemented as part of a business method that performs a process described herein on a subscription or fee basis. For example, a service provider may implement the control program at a customer's generating unit or power plant. In such cases, the service provider may manage the computer system or controllers that performs one or more of the processes described herein for the customer facility.

Figure 3:
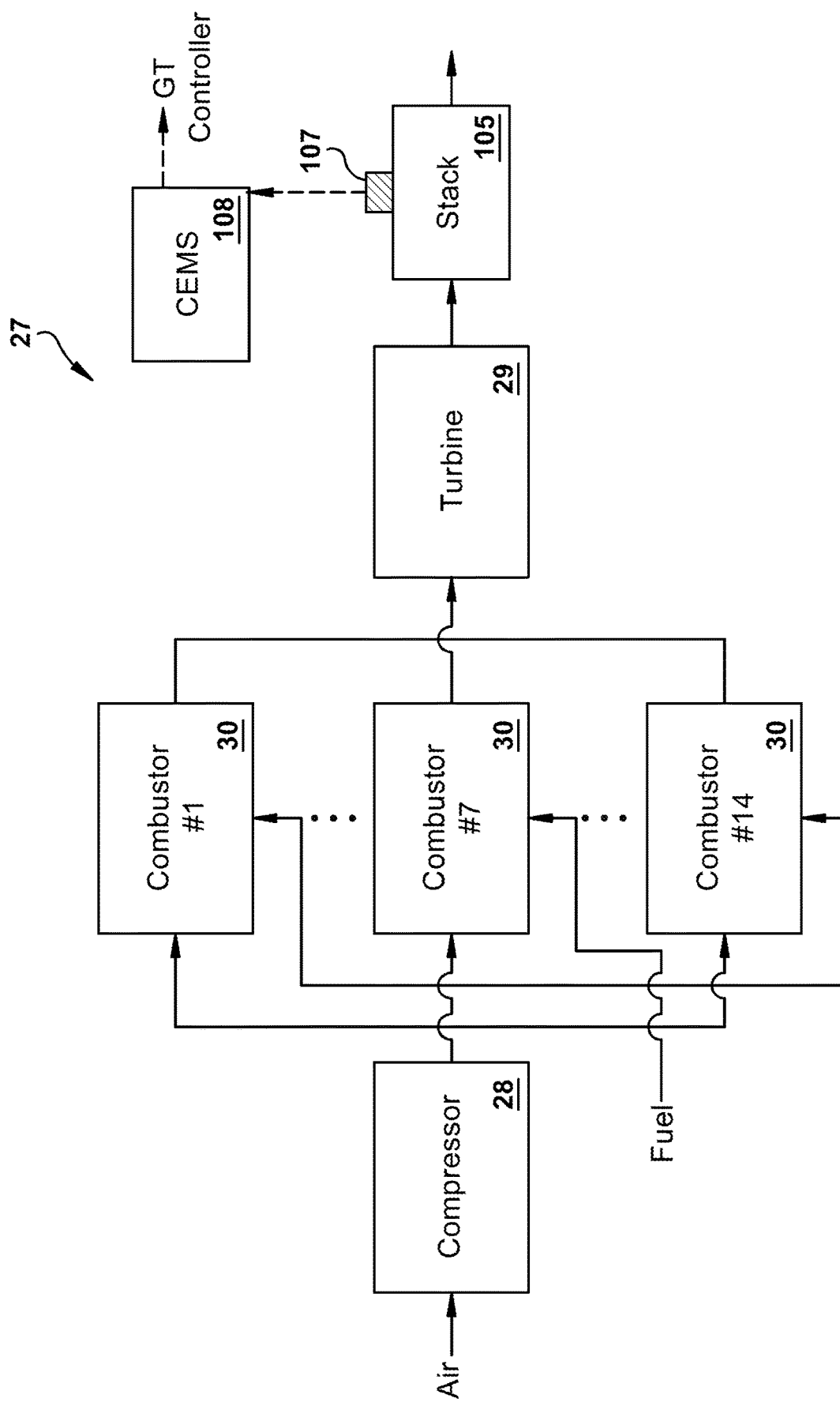
FIG. 3 illustrates a simplified representation of a system that includes a gas turbine in accordance with embodiments of the present disclosure.

With reference now to FIG. 3, a simplified representation of a gas turbine 27 is provided, which will be used to describe certain aspects of the present disclosure. As will be appreciated, within the gas turbine 27, air supplied by a compressor 28 is brought together with fuel within each of the combustors 30, with the air and fuel being inputs that control the amount of load produced by the turbine 29. As already described, characteristics of the inflow of air, such as temperature, pressure and humidity, may be measured at the inlet of the compressor 28 by one or more sensors. Further, an air to fuel ratio of the resulting combustion may be controlled via inlet guide vanes ("IGV") that control the flow of air within the compressor 28. Exhaust gases of the gas turbine 27 contain emissions, such as nitrogen oxides ("NOx") and carbon monoxide ("CO") and, after exiting the turbine 29, are directed through a stack 105. Within the stack 105, the levels of such emissions may be measured by sensors 107 as part of a continuous emission monitoring system ("CEMS") 108. The CEMS 108 may communicate those measurements to the control systems or controller of the gas turbine (or "GT controller"). The GT controller, for example, may be the unit controller 39 discussed above in relation to FIG. 2.

Figure 4:
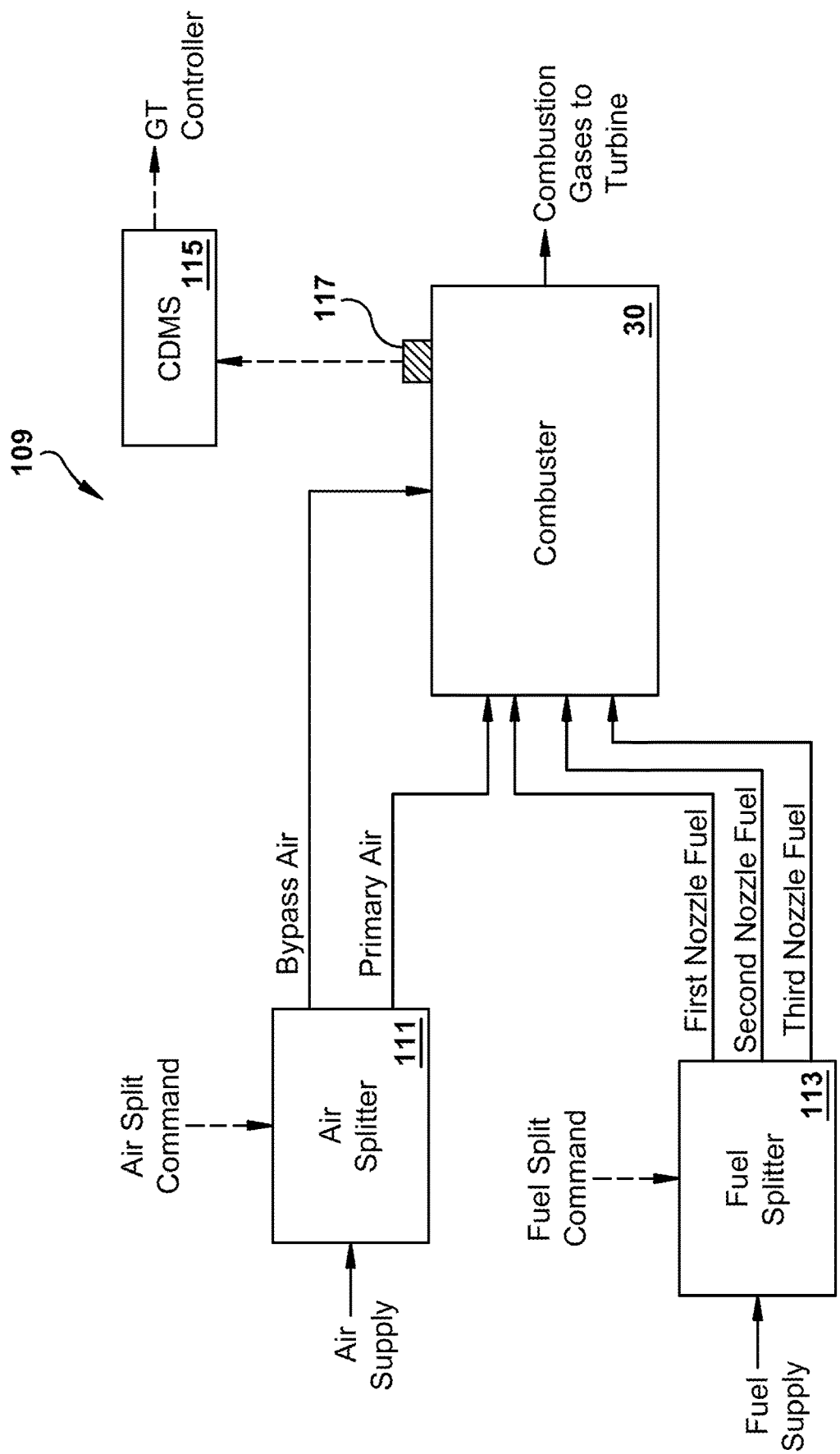
FIG. 4 shows a simplified representation of a combustion system in accordance with embodiments of the present disclosure.

With reference to FIG. 4, a combustion system 109 is shown in relation to a combustor 30 of a gas turbine. As will be appreciated, the manner in which fuel and air are brought together within the combustor 30 affects NOx emission, CO emissions, and combustor dynamics, as well as lean blow out ("LBO"), flashback, and other characteristics of the combustion performance. Because of this, air and fuel supplies may be delivered through splits so that delivery to the combustor 30 may be controllably varied. These splits may include an air splitter 111 and fuel splitter 113. The air splitter 111 may deliver a variable portion of the combustor air supply to two or more different injection points within the combustor 30, for example, directing a variable portion as bypass air that is injected in downstream areas of the combustion zone. That is, the air splitter 111 generally operates by varying, in response to an air split command from the GT controller, the way the air supply is distributed among one or more injection points—for example, between one or more primary injections points disposed near the forward or head end of the combustor 30 and downstream injection points for the bypass air.

The supply of fuel delivered to the combustor 30 may be divided by the fuel splitter 113 so that varying amounts may be sent to two or more different nozzles or nozzle types within the combustor 30. These different nozzles or nozzle types will be referred to generally herein as a first nozzle, a second nozzle, and, when present, a third nozzle. Unless otherwise specified, it should be understood that each of the first, second, and third nozzles may represent any type of nozzle or group of nozzles, and each may be distinguished from the others according to nozzle type, configuration, number, location, or other criteria. Given a typical combustor arrangement, for example, the first nozzle may represent one or more pilot nozzles, the second nozzle may represent one or more primary nozzles, and the third nozzle may represent one or more late-lean or downstream nozzles (which are used to inject fuel and/or air in the downstream areas of the combustion zone within combustor 30 and/or the upstream portions of the turbine 29). First, second, and third nozzles may include both fuel-only nozzles, fuel-air nozzles, or pre-mixed fuel-air nozzles. Embodiments of the present disclosure may be used in combustors having only first and second nozzles, while other embodiments may be used in combustors having more than the three nozzles or nozzle types. The fuel splitter 113 generally operates by varying, in response to a fuel split command from the GT controller, the way the combustor fuel supply is distributed among the first, second, and third nozzles of the combustor 30.

As also shown in FIG. 4, the combustion system 109 may include a combustor dynamics monitoring system ("CDMS") 115. For example, as part of the system of the present disclosure, the CDMS 115 may monitor various vibrational responses or frequencies produced by the combustor 30 during operation via sensors 117. One or more alarm limits may be set, and the CDMS 115 may sound alarms if measured frequencies exceed those limits. Alternatively, the measured frequencies data and alarm limits may be sent to the GT controller, which may use the values to determine if the combustor 30 is operating correctly or malfunctioning and, if malfunctioning, determine whether potential damage to the gas turbine is probable. If it is, the GT controller may send alarm communications or trip of the gas turbine so that such damage is avoided. Sensors 117 used by the CDMS 115 may include pressure and/or acceleration sensors that are positioned on each of the combustors 30 to measure frequency data. For example, the CDMS 115 may use direct mounted or wave guide connected pressure or light sensing probes to measure combustor dynamics.

Thus, in general, operational data related to the performance of the combustion system of a gas turbine may be collected by sensors and communicated to the GT controller. The emission levels of the exhaust may be measured within the stack by the CEMS, and those measurements forwarded to the GT controller. Likewise, combustor dynamics may be measured by pressure sensing probes located within the combustor by the CDMS 115, and those measurements forwarded to the GT controller.

Further, data related to the temperature and heating value of the combustor fuel supply may be collected via one or more conventional sensors and then communicated to the GT controller. Since the combustion tuning process of the present disclosure may include adjusting the temperature of the fuel supply, present embodiments may include two-way communication between the GT controller and a fuel heating unit configured to heat the fuel before it is delivered to the combustors. Specifically, data relating to temperature and heating value of the fuel may be measured and furnished to the GT controller, which, as part of the tuning process, may issue commands to the fuel heating unit to increase/decrease fuel temperature. In the same way, other operational parameters described or suggested herein may also be measured by sensors and then communicated to the control systems of the gas turbine. Such operational data related to the gas turbine and combustion system may be collected periodically, such as, for example, every second or several seconds or several times per minute, and the resulting data provided to the control system of the gas turbine. As will be seen, embodiments of the present invention may use this stream of data to achieve real-time or regular tuning and optimization of the combustion systems of gas turbines.

Figure 5:
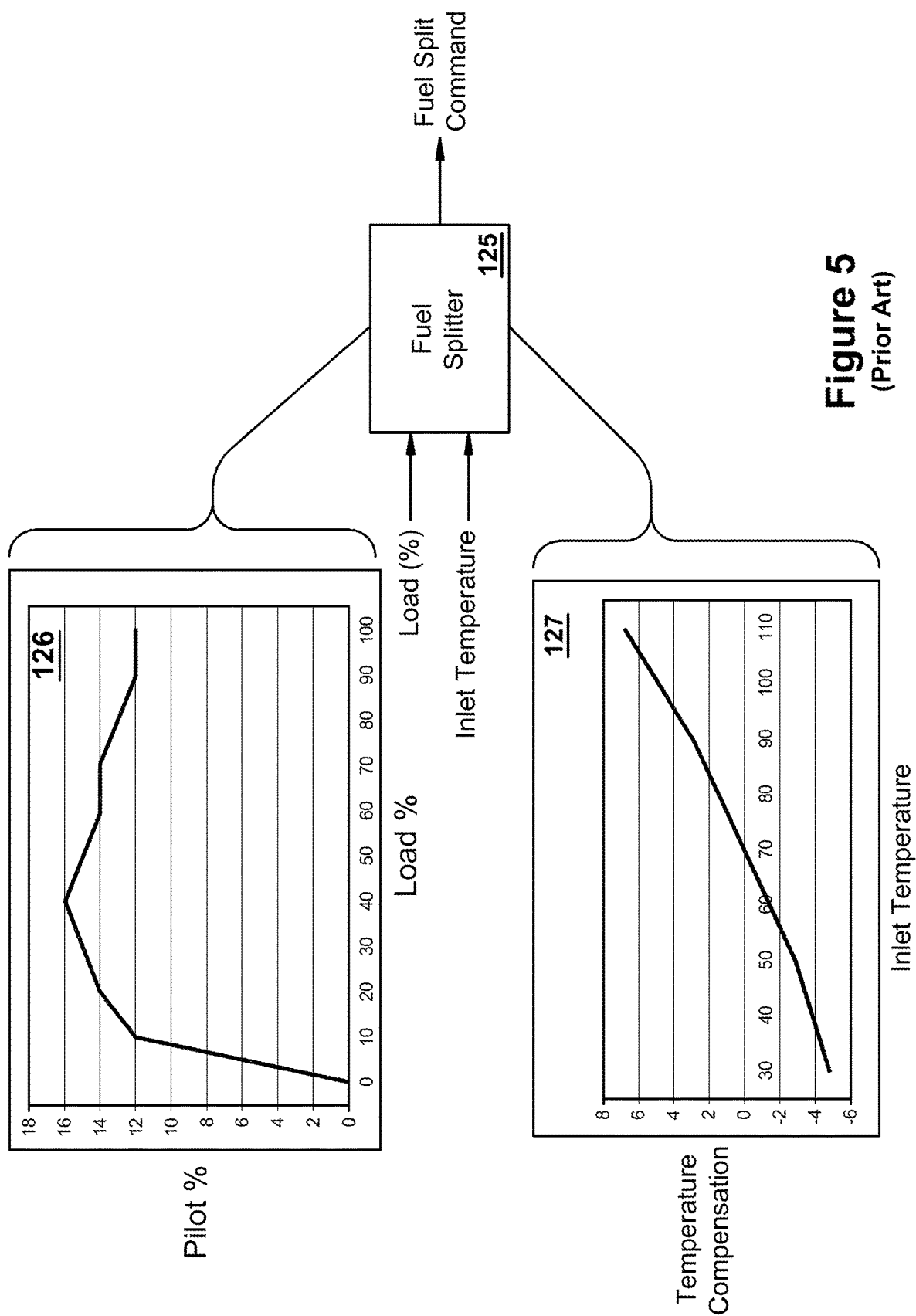
FIG. 5 illustrates a method used by a conventional fuel splitting system to determine a fuel split for a gas turbine.

With reference now to FIG. 5, a conventional fuel splitter 125 and a known method for calculating fuel splits will first be discussed. Traditionally, as shown, the fuel splitter 125 may calculate fuel split as a function of load percentage (as shown, "Load %") that is adjusted according to a "Temperature Compensation" value based on a compressor inlet temperature. Thus, as illustrated in the upper plot 126, a current value of the "Load %" may be initially used to determine a percentage of the fuel supply to deliver to the pilot nozzle (or "Pilot %"), for example, at 90% load the upper plot 126 shows that fuel split for the "Pilot %" is 12%. Then, the lower plot 127 is consulted to determine if this value will be adjusted due to the compressor inlet temperature. That is, using the lower plot 127, the calculated "Pilot %" may be adjusted based upon a current value of the inlet temperature. For example, for an inlet temperature of 55°, the lower plot 127 shows that the value of the "Temperature Compensation" is approximately negative two (−2). This value is applied to the "Pilot %" of 12% to arrive at a final fuel split for the pilot nozzle of 10%. The 10% value is then issued as the fuel split command.

The plots 126, 127 used by the fuel splitter 125 of FIG. 5 are typically manually created or adjusted by tuning personnel or, as used herein, a "tuner". To do this, the tuner moves the gas turbine manually across the load range, and, at predetermined load intervals, the tuner adjust the fuel split to the pilot and observes the effects on emissions, combustor dynamics, etc. Based upon these observations, the tuner then adjusts the two plots 126, 127 to reflect the preferred settings for that particular gas turbine. Typically, a "retuning" of the plots 126, 127 must be done periodically, such as, for example, every few weeks or months, each time requiring approximately 8 hours of manual effort. As will be appreciated, gas turbines must be retuned in this manner because of internal changes and degradation that occurs over time as the gas turbine is fired or due to seasonal changes in ambient conditions. To reduce the need for manually retuning, certain known automated tuning processes have been developed. Conventional combustion auto-tuners, however, have achieved only limited success. Moreover, they are costly because they generally rely on first principles or physics-based models, which are expensive to develop and maintain for each gas turbine frame. As a result, there remains a need for a cost-effective empirical approach for tuning gas turbines, particularly one that can be used generically across a fleet of gas turbines having different frames and manufacturers.

Drawing upon the systems and concepts introduced above, attention will now turn to FIGS. 6 through 16 for further disclosure of the present invention via description of one or more example embodiments. As will be seen, according to the present disclosure, a system is provided for automatically tuning or optimizing the fuel splits in a gas turbine for the purposes of reducing emissions (for example, NOx and CO) and preventing combustor dynamics excursions. According to exemplary embodiments, systems of the present disclosure may formulate the control of fuel splits as an optimization problem and use the results toward controlling gas turbine operation. For example, present systems may employ data-driven or empirical models, for example, neural network models, in combination with an optimizer to solve for the optimized fuel split settings for combustion systems. Present systems may use such models to predict the effects of changes in the fuel splits on the emissions and combustor dynamics and optimize in accordance therewith. As another aspect, present systems may automatically manipulate fuel splits to create data that is subsequently used to train the combustion models. The trained models may then be used in an optimization system to automatically compute appropriate fuel splits for tuning combustion performance. According to alternative embodiments, additional inputs and outputs may be included in the optimization, such as IGV settings, bypass gas, flashback, and others. As will be seen, several performance advantages may be achieved, including those related to improved gas turbine emissions and combustor dynamics. As an additional advantage, the present disclosure may provide gas turbine operators with the flexibility to manage operational trade-offs in real-time. For example, operators may prioritize either emissions or combustor dynamics or some weighted combination thereof.

Figure 6:
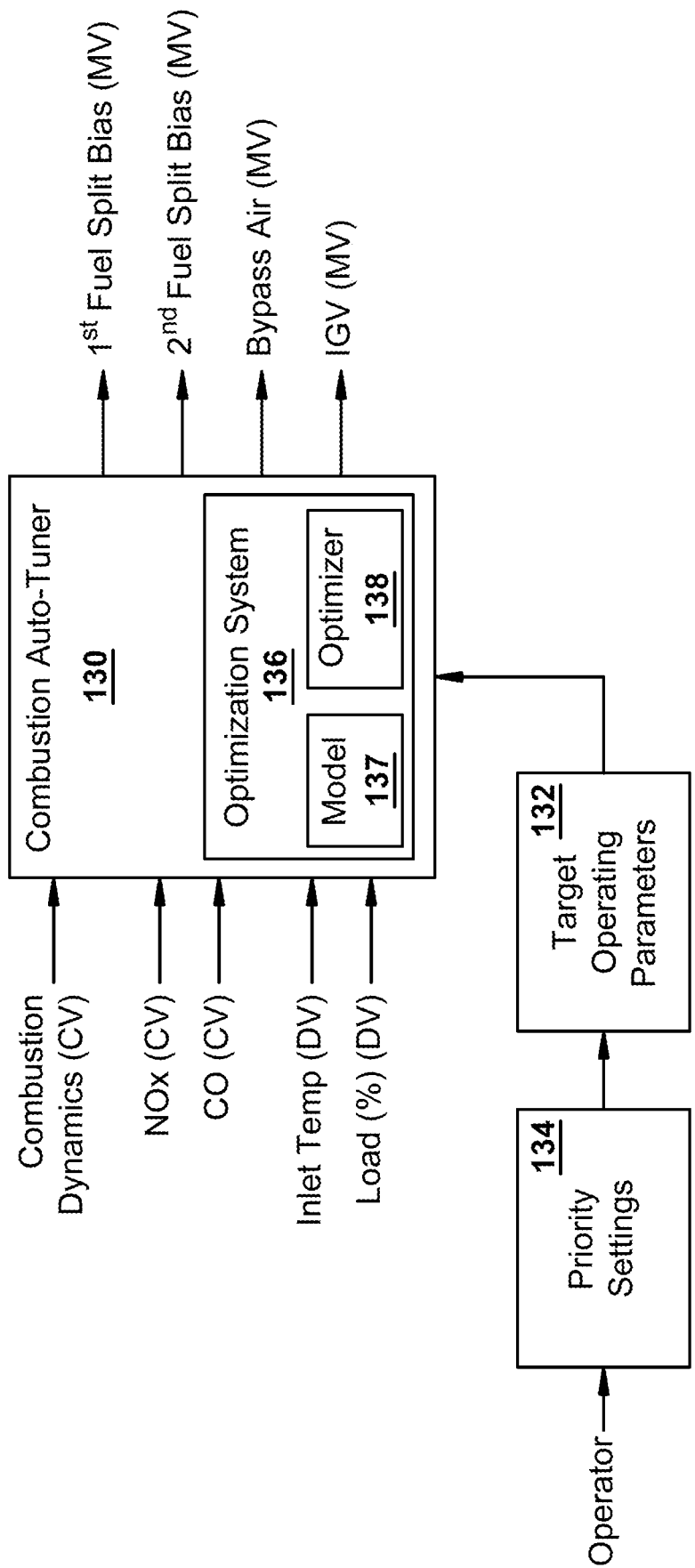
FIG. 6 illustrates an exemplary combustion auto-tuner in accordance with embodiments of the present disclosure.

With reference now to FIG. 6, an exemplary combustion auto-tuning controller or system (also "combustion auto-tuner") 130 is shown in accordance with the present disclosure. The combustion auto-tuner 130 may be a stand-alone computer-implemented controller or control system, such as being integrated within a GT controller, such as, for example, the unit controller 39 discussed in relation to FIG. 2. Also, the combustion auto-tuner 130 may be distributed over several of the computer-implemented nodes described in FIG. 2. The combustion auto-tuner 130 may control or tune the combustion system of the gas turbine to maintain proper performance in variable conditions of ambient temperature, humidity and pressure, all of which vary over time and have a significant effect on combustion operation. The combustion auto-tuner 130 may also maintain the tuning of the gas turbine as parts wear or degrade as well as during variations in fuel composition. As will be appreciated, variation in fuel composition may cause a change in the heat release, which can lead to unacceptable emissions, unstable combustion, or even LBO. As will be seen, the combustion auto-tuner 130 of the present disclosure does not depend upon adjusting fuel composition to compensate for such variables, rather, it tunes operational parameters (for example, fuel splits, fuel temperature, turbine fuel/air ratio, etc.) to bring combustion performance back within desired operational parameters.

As shown in FIG. 6, controlled variables (or "CVs") of the combustion auto-tuner 130 may include NOx, CO, and combustor dynamics. Disturbance variables (or "DVs") may include load percentage and compressor inlet temperature. Other disturbance variables (not shown) may also be included, such as ambient humidity and pressure. According to exemplary embodiments, the manipulated variables (or "MVs") include first and second fuel splits biases and settings related to bypass air and IGV. According to alternative embodiments, other MVs (not shown) may include a fuel temperature setting and overall fuel/air ratio.

As used herein, "fuel splits" refer to settings that determine the distribution of the fuel supply between the various nozzles or nozzle types within the combustor. For example, the fuel splits of a combustor may determine how a combustor fuel supply is divided between a primary nozzle, a pilot nozzle, and/or late-lean or downstream injection nozzles. As the example of FIG. 6 illustrates, the MVs may be described in terms of a "fuel split bias" for the different nozzles of the combustor. As used herein, a fuel split "bias" parameter represents a percentage change to the fuel split that would otherwise apply to a particular one of the nozzles. As described above, the different nozzles of the combustor may be referred to generally as a first nozzle, a second nozzle, and, when present, a third nozzle. In relation to this, a "first fuel split bias" refers to the fuel split bias pertaining to the first nozzle, a "second fuel split bias" refers to a fuel split bias pertaining to the second nozzle, and, when present, a "third fuel split bias" refers to a fuel split bias pertaining to the third nozzle. Thus, for example, a first fuel split bias of negative one (−1) indicates that the fuel split of the first nozzle will be reduced by one percent (1%). Or, for example, if the fuel split of the second nozzle is 12% and the combustion auto-tuner 130 calculates a value of positive two (+2) for the second fuel split bias, the fuel split of the second nozzle would be adjusted to 14%.

Pursuant to the systems described herein, data received from the various sensors relating to combustor dynamics, exhaust emissions, and other relevant combustion parameters may be communicated to the GT controller, e.g., the unit controller 39, and/or the combustion auto-tuner 130. As also shown in FIG. 6, the combustion auto-tuner 130 may receive target operating parameters 132, against which received sensor data may be compared to determine if the combustion system operating in accordance therewith. According to preferred embodiments, such target operating parameters 132 may be based on priority settings 134, which are defined, at least in part, on input received from an operator. If the combustion system of the gas turbine is operating within the target operating parameters, the settings of the MVs may be held in place by the GT controller. However, if it is not, the combustion auto-tuner 130 may suggest a series of adjustments to the MVs so to achieve target operation, which may be implemented by the GT controller.

As will be described more below, the combustion auto-tuner 130 may include an optimization system 136 and the suggested adjustments to the MVs may be based on its operation. The optimization system 136 may include a model 137, which models the combustion system of the gas turbine, and an optimizer 138. The optimization system 136 may use the model 137 and optimizer 138 to optimize a cost function, which may correspond to the priority settings received from the operator. An interface display may be provided that allows an operator to select between different operational priorities for the combustion system and/or gas turbine. For example, such priority settings may include alternatives that prioritize emissions and combustor dynamics differently, and this prioritization may be reflected in the cost function that is used in the optimization. Operational priorities may include minimizing NOx, CO, or combustor dynamics, or maximizing generated load, efficiency, etc. Such functionality may allow an operator to switch between operational priorities in response to changing market conditions, gas turbine performance characteristics, ambient conditions, etc.

Figure 7:
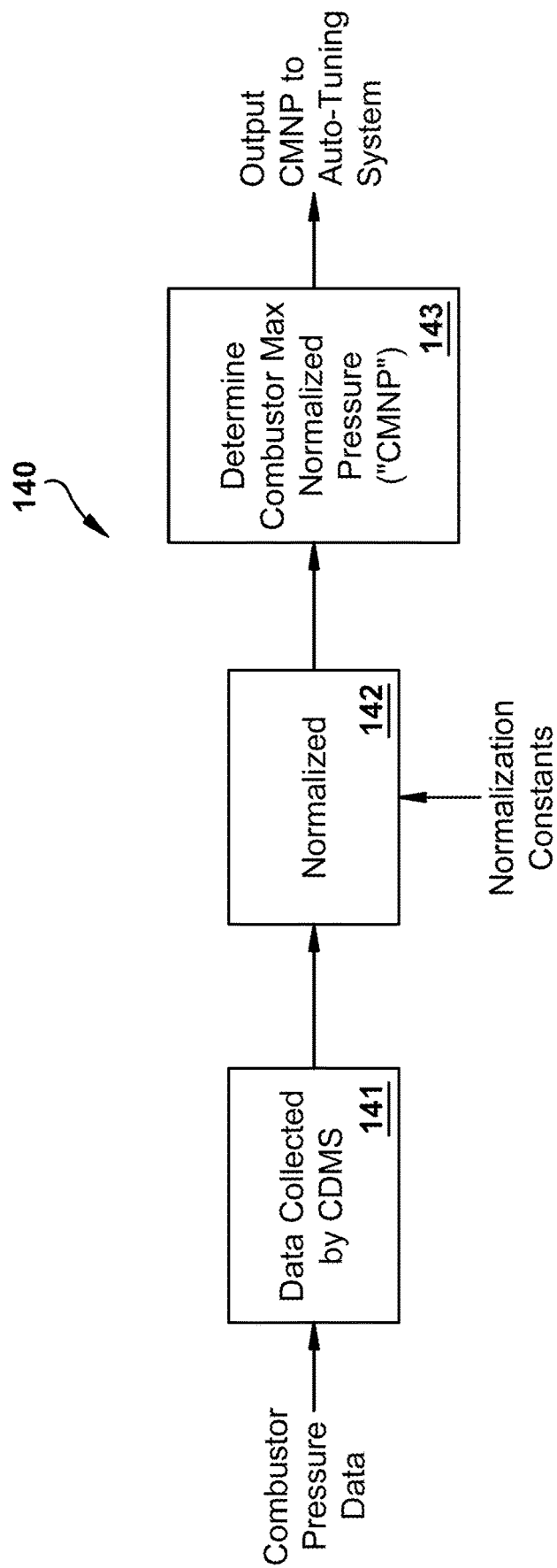
FIG. 7 illustrates a system for monitoring combustor dynamics in accordance with embodiments of the present disclosure.

With reference now to FIG. 7, a schematic is shown of a method 140 for monitoring and collecting data related to combustor dynamics in accordance with embodiments of the present disclosure. At block 141, for example, the previously introduced CDMS 115 may measure the vibrational response or frequencies produced by the each of the combustors of the gas turbine during operation. As indicated in the second block 142, the measured frequencies across each of the combustors of the gas turbine may be normalized via derived normalization constants. In the next block 143, a maximum value may be determined and output to the combustion auto-tuner 130 as a combustor maximum normalized pressure (or "CMNP"). According to present disclosure, the CMNP represents a specific type of combustor dynamics data that the combustion auto-tuner 130 may use toward efficient combustion tuning.

Figure 8:
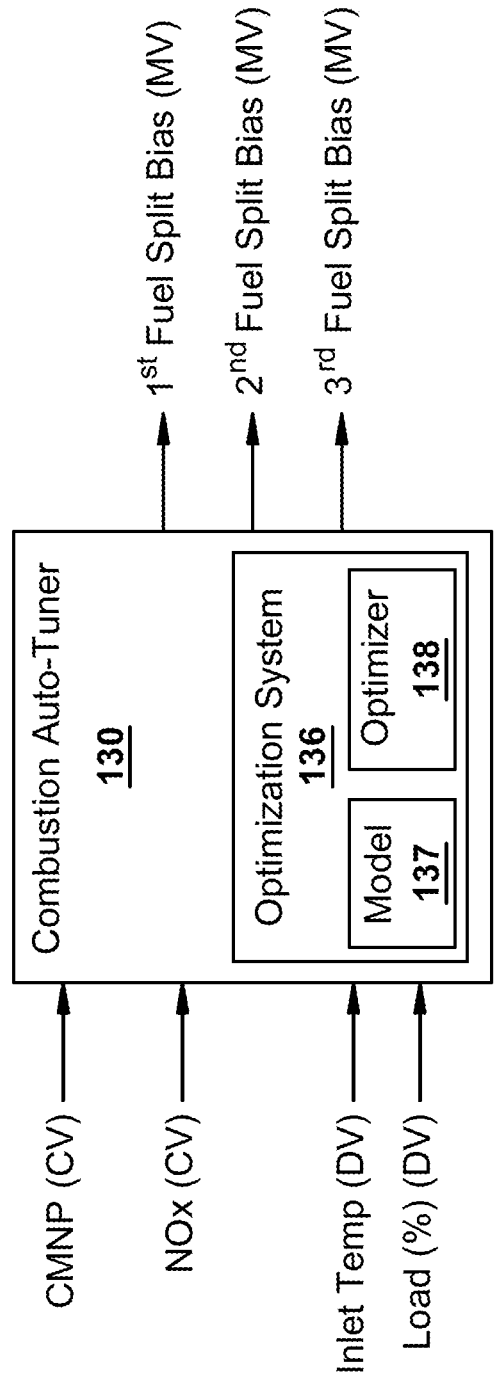
FIG. 8 illustrates an alternative combustion auto-tuner in accordance with embodiments of the present disclosure.

With reference now to FIG. 8, an alternative combustion auto-tuner 130 is shown that includes the above-introduced CMNP as a controlled variable along with NOx. The combustion auto-tuner 130 may be used to maintain both NOx and CMNP below respective predetermined limits. To do this, the combustion auto-tuner 130 may use fuel split biases as MVs to tune combustion, which may include determining first, second, and third fuel splits biases that correspond respectively to first, second, and third nozzles. In accordance with an exemplary embodiment, the first nozzle may represent a pilot nozzle, the second nozzle may a primary nozzle, and the third nozzle may represent a downstream injection nozzle. Other configurations involving other nozzle types are also possible.

The combustion auto-tuner 130 may include a limitation that the net change in fuel split biases is equal to zero (0). For example, such a limitation may take the following form:

[first fuel split bias]−[second fuel split bias]−[third fuel split bias]=0

This type of condition limits the problem to two free dimensions. Because load percentage and inlet temperature also affect the controlled variables—i.e., NOx and CMNP— these are also be included as DVs.

Figure 9:
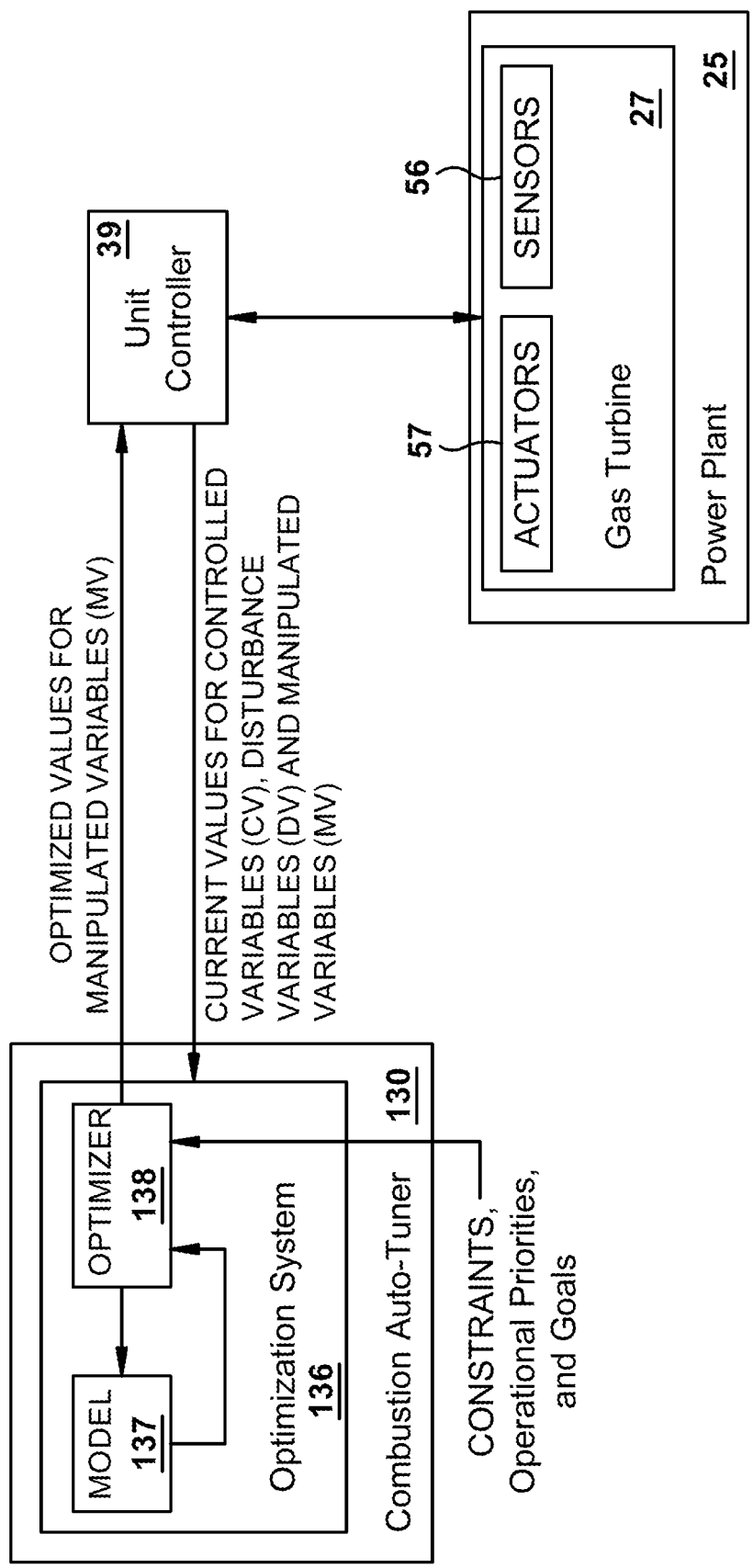
FIG. 9 provides a block diagram illustrating aspects of an optimization system in accordance with exemplary embodiments of the present disclosure.

With reference to FIG. 9, exemplary operation of the optimization system 136 of the combustion auto-tuner 130 is illustrated. As stated above, the optimization system 136 may include an optimizer 138 and model 137. As the embodiment of FIG. 9 shows, the optimization system 136 may be part of the combustion auto-tuner 130, which communicates with the unit controller 39. The unit controller 39 may be a computer-based controller that controls the operation of a gas turbine 27, which, for example, may be located within a power plant 25. The combustion auto-tuner 130 may be a computer-implemented controller that provides supervisory or advisory control to the unit controller 39. It should be understood that in alternative embodiments the various computer-implemented components shown in FIG. 9 may reside on the same computer or be distributed across a plurality of different computer systems. For example, the model 137 may reside on a different computer system than the optimizer 138. Further, an operator interface (not shown) may provide means for an operator to communicate with the unit controller 39 and/or the combustion auto-tuner 130. As described in relation to FIG. 2, the gas turbine 27 may include a plurality of actuators 57 and sensors 56. The sensors 56 may include devices for sensing and measuring various operating parameters, while the actuators 57 may include devices for actuating components such as valves and dampers to implement control.

As will be appreciated, the model 137—which will be discussed more below in reference to FIGS. 10 through 16—is a representation of the relationship between (a) the manipulated variables and disturbance variables and (b) the controlled variables of the combustion system of the gas turbine. Manipulated variables, or MVs, represent those variables that may be changed by an operator or the optimization system 136 to affect the controlled variables, or CVs, and may include any of those already listed. Disturbance variables, or DVs, refer to those variables that affect the controlled variables but cannot be manipulated by an operator, and may include any of those already listed. As will be appreciated, the optimizer 138 may function by determining an enhanced or optimal set of setpoint values for the MVs given (1) a desired goal associated with operation of the gas turbine 27 (e.g., minimizing NOx, CO or combustor dynamics) and (2) constraints associated with operation of the gas turbine 27 (e.g., limits on emissions).

At a predetermined frequency, the optimization system 136 may obtain the current values of manipulated variables, controlled variables and disturbance variables from the unit controller 39. An "optimization cycle" commences each time the current values for the manipulated variables, controlled variables and disturbance variables are read out from the unit controller 39. The optimization system 136 then may use the model 137 and optimizer 138 to determine an optimal set of setpoint values for the manipulated variables based upon current conditions of gas turbine 27. The combustion auto-tuner 130 may then send the optimal set of setpoint values to the unit controller 39. The unit controller 39 may be configured to automatically implement the optimal set of setpoint values in the control of the gas turbine 27. Alternatively, an operator of the power plant 25 may have the option of approving the use by the unit controller 39 of the optimal set of setpoint values. The combustion auto-tuner 130 and optimization system 136 may run in a closed loop adjusting the setpoints values of the manipulated variables at a predetermined frequency of the optimization cycle (e.g., as frequently as every second or 10 seconds or as infrequently as every half hour).

In deriving the optimal set of setpoint values, the optimizer 138 may use the model 137 to predict future operation of the combustion system in order to minimize a cost function subject to a set of constraints. The cost function is a mathematical representation of desired operational goals for the gas turbine. For instance, to minimize NOx, the cost function may include a term that decreases as the level of NOx decreases. One common method for minimizing a cost function is known as "gradient descent optimization." Gradient descent is an optimization algorithm that approaches a local minimum of a function by taking steps proportional to the negative of the gradient (or the approximate gradient) of the function at the current point. Constraints may be placed upon both the inputs (MVs) and outputs (CVs) of the gas turbine 27 at a future time. Typically, constraints that are consistent with limits associated with the unit controller 39 are placed upon the manipulated variables. Constraints on the outputs (CVs) are determined by the problem that is being solved.

According to a preferred embodiment, the optimizer 138 uses nonlinear programming ("NLP") optimization to solve the optimization problem. However, it should be understood that a number of different optimization techniques also may be used depending on the form of the model, cost function, and constraints. For example, it is contemplated that the optimizer 138 may be implemented by using, individually or in combination, a variety of different types of optimization approaches. These optimization approaches include, but not limited to, linear programming, quadratic programming, mixed integer non-linear programming, stochastic programming, global non-linear programming, genetic algorithms, and particle/swarm techniques. An NLP optimizer can solve problems with 20 manipulated variables and 10 controlled variables in less than one second. This is sufficiently fast for the present application since the optimization cycle is typically in the range of anywhere from a less than a second to 20 minutes.

The model 137 of the optimization system 136 is configured to capture the relationship between the manipulated and disturbance variables and the controlled variables of the combustion system of the gas turbine. According to exemplary embodiments, the model 137 used by the optimization system 136 may take several different forms. For example, such models can be developed based upon: 1) known first principle equations describing the system, resulting in a physics-based model; 2) data, resulting in an empirical model; or 3) a combination first principle equations and data. However, in modeling NOx and CO emissions and combustor dynamics in gas turbine combustion, models based on first principle equations are difficult to derive and maintain. For this reason, in accordance with preferred embodiments, the model 137 comprises a data-driven or empirical model, which is based upon data collected from actual operation of the gas turbine and the combustion system thereof.

According to preferred embodiments, the model 137 is a nonlinear model. In order to properly capture the relationship between the manipulated/disturbance variables and the controlled variables associated with gas turbine combustion, a nonlinear model may be necessary. Nonlinear models can represent curved rather than straight-line relationships, which are common to complex systems such as those discussed herein. Given the foregoing requirements, a neural network based approach is presently a preferred embodiment for implementing the empirical model for the model 137. Neural networks are developed based upon empirical data using advanced regression algorithms. See, e.g., C. Bishop, Pattern Recognition and Machine Learning, Springer, New York, N.Y., 2006, fully incorporated herein by reference. Neural networks are effective at capturing the nonlinearity commonly exhibited by complex systems like gas turbines. Thus, according to exemplary embodiments, the model 137 of the optimization system 136 is a data-driven or empirical model, i.e., based on collected data. Further, in accordance with preferred embodiments, the type of empirical model used for the model 137 is a neural network. In addition, other types of empirical modeling techniques may be used to model the combustion system. For example, the model 137 may further include a type of model selected from the following list: a support vector machine model, a random forest model, a decision trees model, a k-means model, a principal component analysis ("PCA") model, a gradient boost model, and a parametric equation fitting model.

Figure 10:
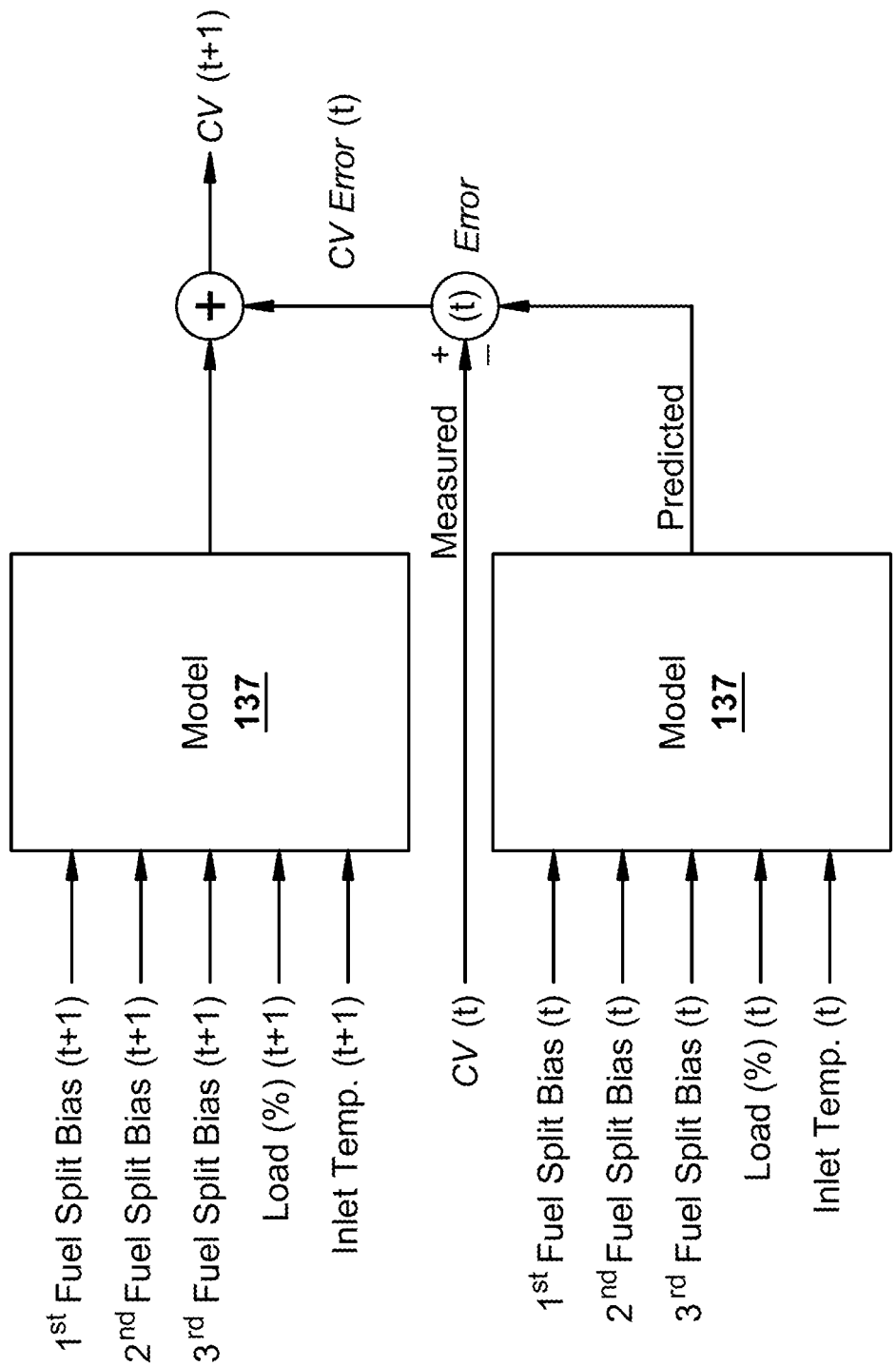
FIG. 10 illustrates a model with disturbance rejection as may be used with an optimization system of the combustion auto-tuner in accordance with the present disclosure.

With reference now to FIGS. 10, 11, 12, and 13, the optimization system 136 of the combustion auto-tuner 130 may use the model 137 in accordance with several alternative methodologies. For example, as shown in FIG. 10, the model 137 is configured to predict future values for CVs— such as, NOx, CO, and/or combustor dynamics (i.e., "CMNP")—using disturbance rejection, which is further described in U.S. Pat. No. 7,123,971, which is fully incorporated herein by reference. As shown, the model 137 is used to predict a CV at time (t) using the MVs and DVs at time (t), which is then compared to the actual or measured value of the CV at time (t). The difference between the prediction of the controlled variable at time (t) and the actual value of the controlled variable at time (t) is then calculated and added to the prediction of NOx from the model 137 for time (t+1). In this way, the prediction at time (t+1) is biased by the error in the prediction at time (t).

The disturbance rejection approach has proven useful for optimization processes. This is because, in optimization, interest is in minimizing, for example, NOx, at time (t+1) by determining a set of values for the MVs at time (t). The error in the model at the current time is known and can be used to bias the prediction at time (t+1). In this way, disturbance rejection allows the rejection of slowly varying unmeasured disturbance in the model prediction. For this reason, the approach of FIG. 10 is a preferred embodiment.

Figure 11:
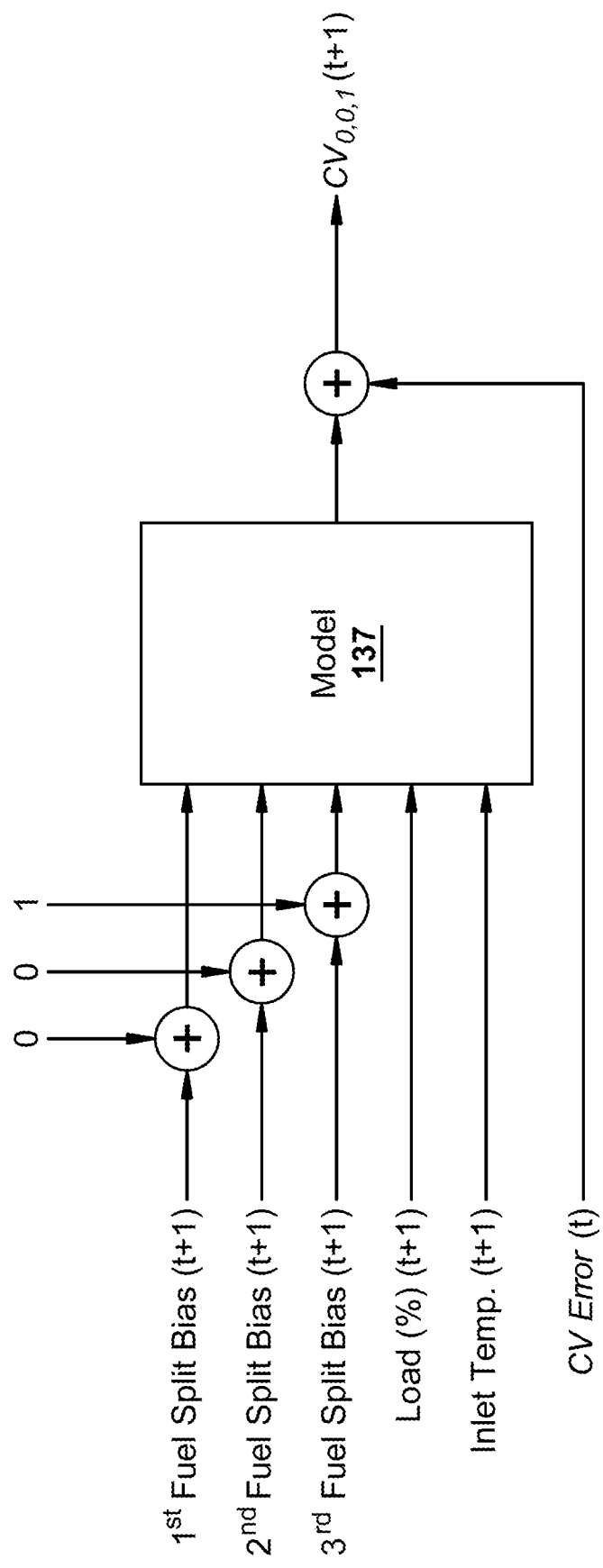
FIG. 11 illustrates a model having an added fixed bias set as may be used with an optimization system of the combustion auto-tuner in accordance with the present disclosure.
Figure 12:
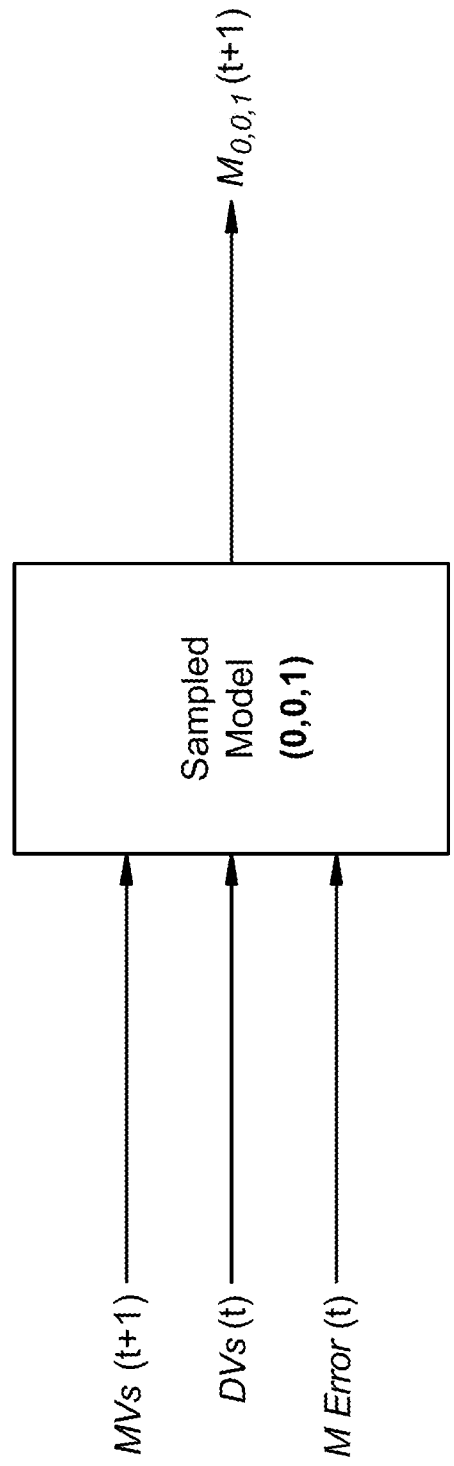
FIG. 12 shows a simplified version of the model of FIG. 10.

With reference to FIG. 11, an alternative model configuration is provided in which the sampled model 137 has a fixed bias set added to it. As will be appreciated, the nomenclature on the output indicates the pattern of the fixed bias set. With reference to FIG. 12, a simplified version of this type of model is illustrated. In this case, the fuel split biases are generalized as MVs, while load percentage and inlet temperature are generalized as DVs. Also, as this model is used to optimize MVs in the future—i.e., when values for the DVs are unknown—the DVs are assumed as not changing, thus: DVs(t)=DVs(t+1). The error is fixed and computed as shown, with the pattern (0, 0, 1) indicative as to how the fixed bias set is added.

Figure 13:
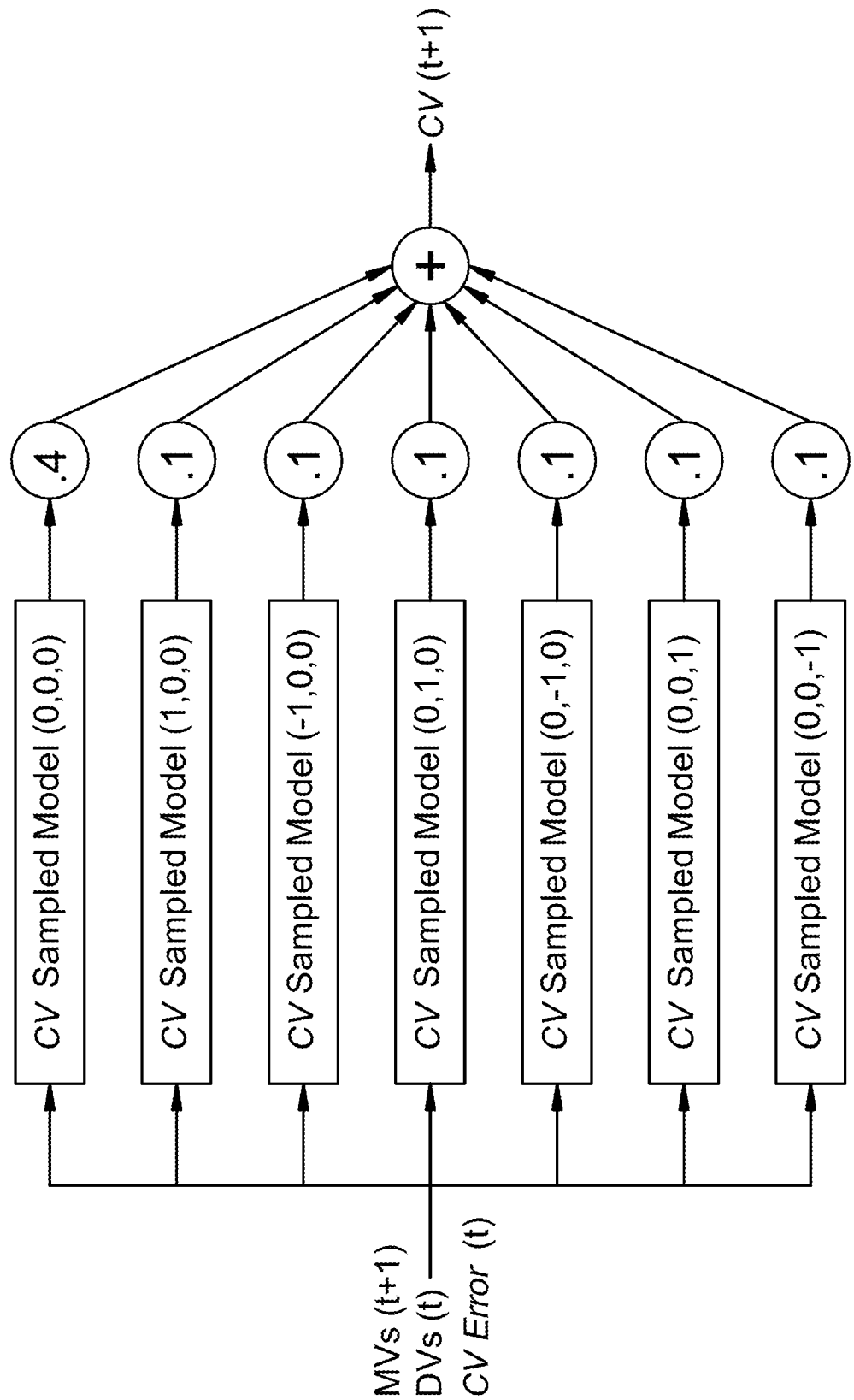
FIG. 13 shows an aggregate model as may be used with an optimization system of the combustion auto-tuner in accordance in accordance with the present disclosure.

With reference to FIG. 13, an aggregate model for predicting a CV, such as NOx, CO, and/or combustor dynamics (i.e., "CMNP"), is shown. The aggregate model may be used to provide a weighted average of the CV around the MVs. According to exemplary embodiments, this form may be used to penalize bias values in the optimization that produce results close to the high values or limits set for the CVs. In this case, the values are penalized if they are within a predetermined distance of those limits. In this way, the optimization may be used to optimize continuously updated values for the MVs. For example, a cost function may be constructed that is a function of the MVs. Constraints may be included that are also a function of the MVs. While the cost function and constraints must be continuous functions, they are allowed to be nonlinear. Upper limits or bounds also can be placed on the MVs. Then, given the MVs, cost function, constraints, and MV bounds, a non-linear programming ("NLP") solver may be used to find the MVs that, subject to the bounds and constraints, minimize the cost function.

More specifically, for example, such a cost function may take the following form:

Cost=$(NOx(t+1)/s_1)^2+(CMNP(t+1)/s_2)^2$ where NOx(t+1) and CMNP(t+1) are predicted by the aggregate models, and $s_1$ and $s_2$ are scaling factors used to trade off NOx versus CMNP performance. The constraints, for example, may include that the net change in fuel split biases is equal to zero (0). And, the bounds, for example, may include:

$F+$>First Fuel Split Bias$(t+1)$>$F-$ $S+$>Second Fuel Split Bias$(t+1)$>$S-$ $T+$>Third Fuel Split Bias$(t+1)$>$T-$ where the values of F+, F−, S+, S−, T+, and T− are fixed values that are predetermined prior to the optimization run. Given the cost, constraints, and bounds, an optimizer, such as an NLP optimizer, may determine the MVs(t+1) that minimize costs, i.e., C, subject to the defined constraints and bounds.

The optimizer 138 may run periodically, for example, every 300, 27, 10, 5, or 1 seconds and compute the optimal MVs, which then may be used to bias the fuel splits and/or other MVs for the gas turbine. Thus, systems and methods of the present disclosure may optimize, tune, and/or control aspects of combustion and combustor performance within gas turbines.

The disclosure will now discuss further aspects of exemplary empirical models, such as neural networks, and issues related to "Design of Experiments" for collecting data and then training the models per the collected data. Because the settings for the manipulated variables for a gas turbine may not have been varied adequately during normal operation, it is typically necessary to perform a "Design of Experiments" to collect the operational data required to build and train such data-driven models.

Figure 14:
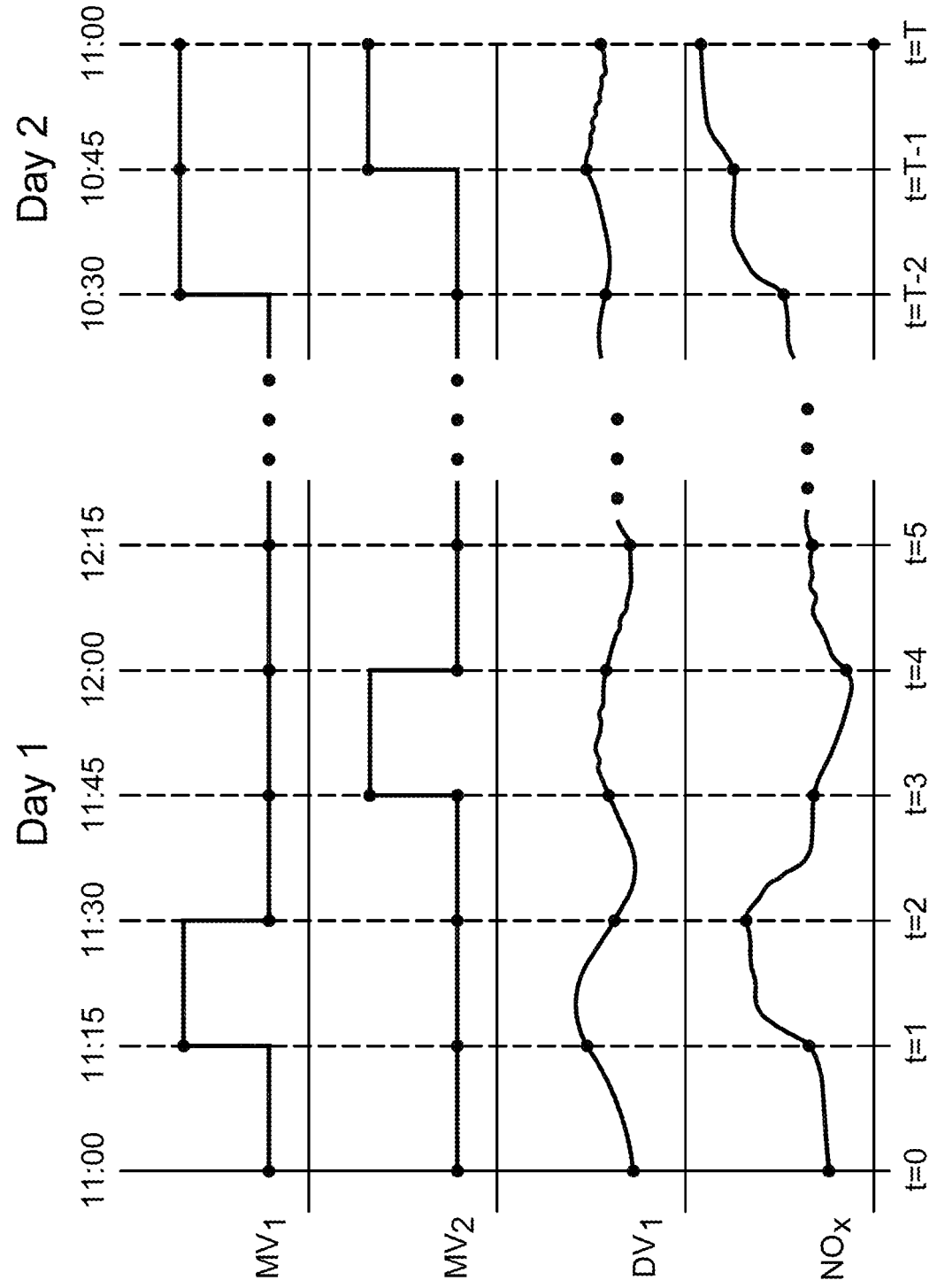
FIG. 14 shows an example "Design of Experiments" for collecting data for training a model in accordance with the present disclosure.

FIG. 14 shows results of an exemplary "Design of Experiments" for collecting data for training an empirical model, such as, for example, a neural network. As shown, a time-series plot of two MVs, a DV, and a CV of interest, which is depicted as NOx emissions, is provided. $MV_1$, for example, may represent first fuel split bias associated with a first nozzle, while $MV_2$, for example, may represent second fuel split bias associated with a second nozzle. The DV, for example, may represent a load percentage or compressor inlet temperature. It will be appreciated that while only 2 MVs, 1 DV and 1 CV are shown in this example, data is typically collected for many MVs, DVs, and CVs when performing a data collecting run in accordance with a Design of Experiments. The sampling time of the data is provided at the top of the plot. In this case, sampling starts at 11:00 am on Day 1 and concludes at 11:00 am on Day 2, with samples being collected every fifteen minutes. The first sample is labeled time t=0, the second is labeled time t=1, etc., up to the last point of time t=T.

It will be appreciated that the goal of the Design of Experiments is to collect sufficient data to develop or train the empirical model so that the model can then be used to optimize combustion performance. To perform an appropriate Design of Experiments, the MVs may be moved independently such that the moves are uncorrelated over time. As shown in FIG. 14, at each sampling time, the MVs are moved (if they are to be moved for the sample period). After that, the MVs are held constant until the next sampling time. In illustrated case, the interest is in building a steady state model and, thus, the sampling time is made sufficiently long to allow the process to come to steady state. Thus, because a move in a MV may take several minutes or longer for the effect to be fully realized, the sampling time may be made to accommodate this lag. (In the present application, the focus is primarily on steady state models. It should be appreciated, though, that present systems and methods may be extended to dynamic models.) For example, as shown in FIG. 14, the effects of moving $MV_1$ and holding it steady from time (t=1) to just prior to time (t=2) influences the NOx level at time (t=2).

The sampled points depicted in FIG. 14 of the MVs, DV and NOx may be used as a training dataset for the training of the empirical model, such as, for example, the model 137 of FIGS. 6 and 8. In cases where the model includes a neural network and/or disturbance rejection, the model may be trained via the methods and systems described in detail in U.S. Pat. No. 7,123,971 and U.S. Patent Application Publication No. 20180024512, both of which are incorporated herein by reference in their entirety. Once the model is trained, it may be used in any of the optimization systems 136 described herein.

Figure 15:
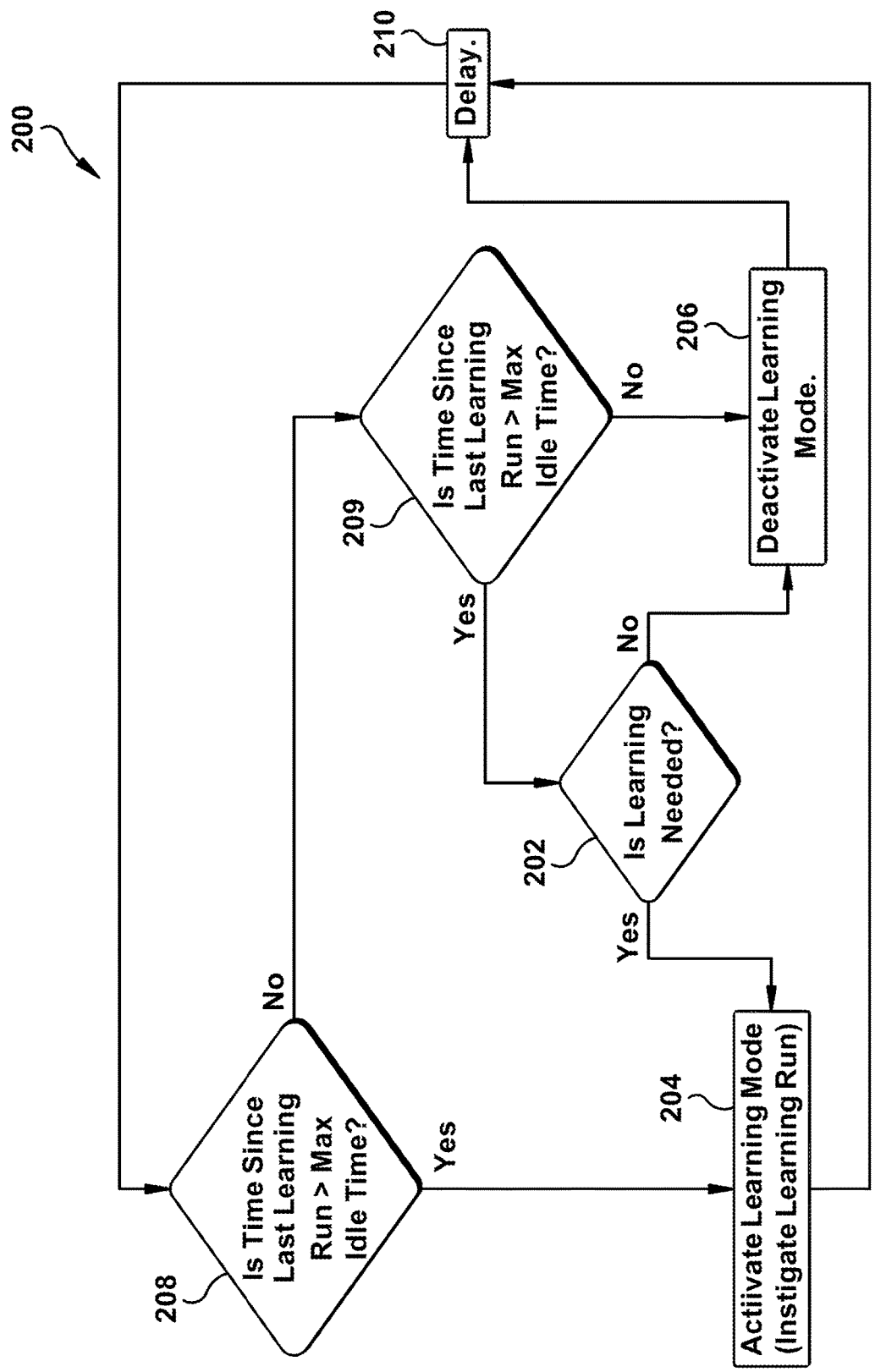
FIG. 15 illustrates a method of automated learning for a model in accordance with the present disclosure.

FIG. 15 illustrates a method 200 in accordance with the present disclosure is shown that relates to an automated process by which data is gathered to train empirical models, such as neural networks, that may be used as model 137 within the optimization system 136. The method 200 may begin (block 202) where it is determined if additional data or "learning" is needed for the model. If it is determined that "yes" learning is needed—and the load for the gas turbine is determined to be sufficiently stable for data collection—then a "learning mode" may be activated (block 204) and a "learning run" instigated for a period of gas turbine operation, for example, 1 hour. The learning run may be configured to collect the data in the manner shown above in FIG. 14. The collected data then may be used to further train the model 137. If it is instead determined that additional learning is not needed, then the learning mode may be deactivated or remain deactivated (block 206).

As further shown, the method 200 may include a maximum idle time and a minimum idle time that govern aspects as to the activation of the learning mode. For example, a value for the maximum idle time (block 208) may be set, such as, for example, 5 days, after which the learning mode is automatically activated even in the absence of a determination that learning is needed. In this way, the maximum idle time guarantees that the time between learning runs never exceeds a predetermined maximum period. A value for the minimum idle time (block 209) also may be set, for example, 1 day. In this way, for example, once the learning mode is turned on and data is collected, there is a guaranteed minimum time period before another learning run is performed. If, however, the time since last learning run is between the maximum and minimum idle times, it is the "Is Learning Needed?" determination (block 202) that governs whether the learning mode is activated. A delay (block 210) may be used to limit the frequency at which the method 200 cycles through the analysis.

According to a preferred embodiment, the "Is Learning Needed?" determination (block 202) is made in the following way. First, a historical training data database of previous learning runs, moves, and collected training data over a predefined prior time period, such as, for example, the last 6 or 12 months, is consulted. From this consultation a data need may be determined. Using the historical training data database, the Euclidian distance from the current operating point—for example, as defined by load percentage and inlet temperature—to the five nearest neighboring data points in the historical training data database is computed. If the average distance to the five nearest neighboring data points is greater than a predefined threshold, then it is determined that not enough data is available at the current load and temperature and, thus, that learning is needed. Other methods for making this determination are also possible.

Figure 16:
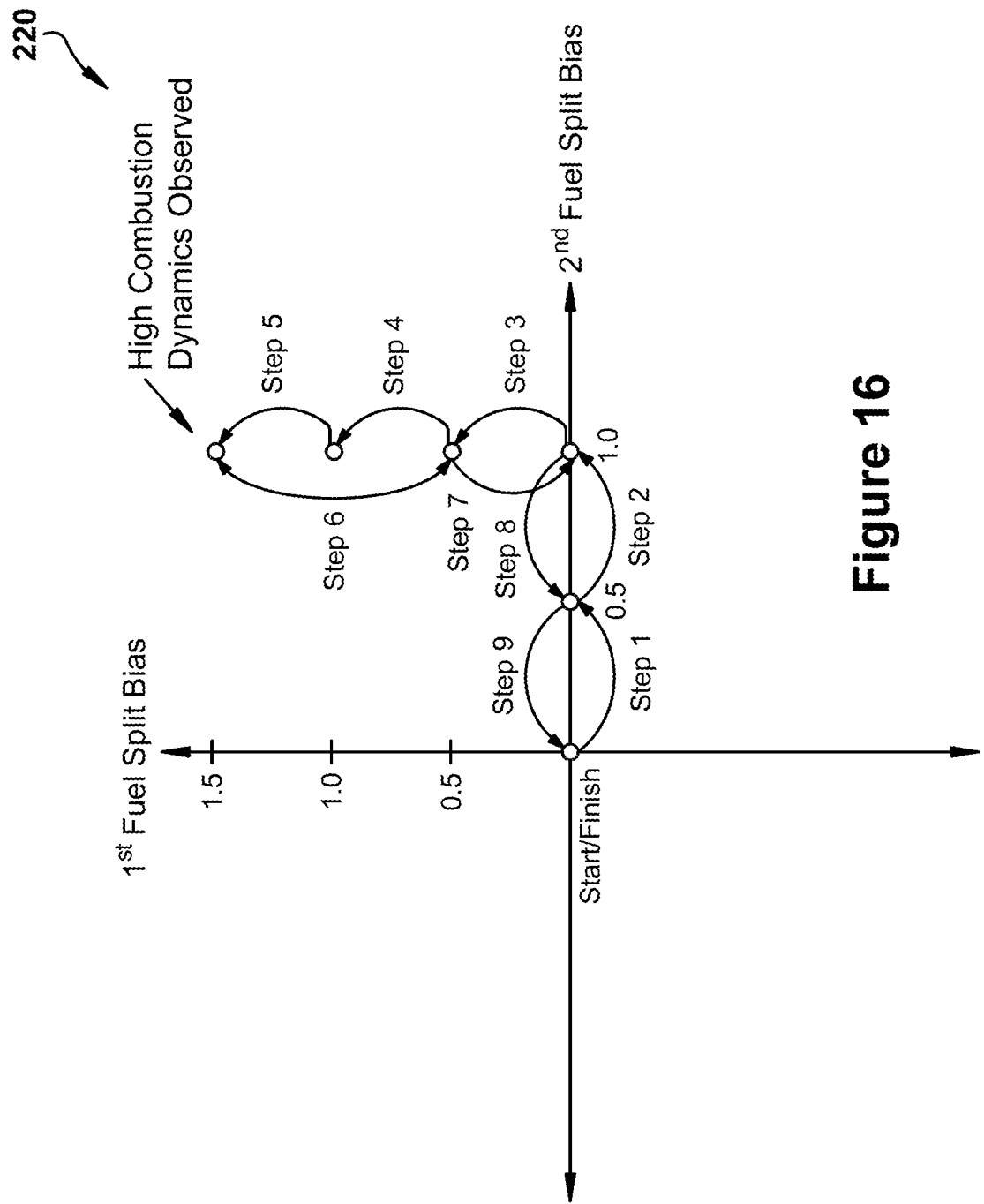
FIG. 16 illustrates an exemplary learning run for gathering a training dataset for training a model in accordance with the present disclosure.

FIG. 16 illustrates an exemplary learning run 220 made during a learning mode for gathering or augmenting a training dataset for training empirical models in accordance with the present disclosure. In general, as will be appreciated, a learning run is made to more fully populate a training dataset with data representative of operation under wide-range of potential operating conditions. Training datasets that are more complete produce better models.

The learning run 220 may begin at a current operating condition defined as (0,0), i.e., the first fuel split bias is zero and second fuel split bias is zero. In the exemplary case shown, only two dimensions are required, however, it should be understood that three dimensions may be used to include another fuel split bias. The learning run 220 may include several incremental steps in which only one of the first and second fuel split biases are moved at a time. Thus, for example, a Step 1 may include a move in which the second fuel split bias is moved from 0.0 to 0.5%. The fuel split biases may then be held steady for a period of time, for example 5 or 10 or 15 minutes, so that the measured value for the CV, for example, an emission level or combustion dynamics, includes any change in value caused by the Step 1 move. A Step 2 then may be made in which the fuel split biases are moved from (0.5, 0) to (1.0, 0). Again, the fuel split biases may be held steady for a period of time and a steady state measurement recorded. The example may continue with Steps 3, 4 and 5, as shown. After the Step 5 move is made, high combustion dynamics are observed that include, for example, dynamics registering above a predetermined threshold. Because high dynamics may cause damage to the machine, the next step, Step 6, may occur immediately upon observation of the high dynamics. Thus, the machine may only be at (1.0, 1.5) for a few seconds rather than longer period of the other steps. Steps 7, 8 and 9 may then follow, with a hold period and measurements recorded of steady state operation. In this way, data reflecting operation over a range of operating conditions may be gathered in a single learning run.

According to exemplary embodiments, learning runs may be configured to collect new data relating to untested combinations of MVs and DVs and/or combinations of MVs and DVs that have not been tested recently, which collectively will be referred to as "underrepresented data" within the training dataset. That is, embodiments of the present disclosure may place emphasis on collecting underrepresented data in the learning runs that it activates. To do this, systems of the present disclosure may monitor ongoing operating conditions during gas turbine operation and determine those instances when current operating conditions are equal to or approximately equal to operating conditions that have been found underrepresented in the training dataset. This functionality may enable the more efficient and cost-effective collection of the data that is most needed in the training dataset. For example, present embodiments may monitor gas turbine operation and compare current conditions against a list of prioritized or underrepresented data, and determine when opportunities arise for acquiring that data without the need for significant deviations from the current operating plan of the gas turbine.

Thus, for example, an exemplary mode of operation of present embodiments may include executing a model training process that includes the following. Additional data may be obtained for inclusion within an original training dataset in order to create a revised training dataset. The additional data may include measured values of the inputs and outputs by the sensors during a selected period of operation of the combustion system. The model of the optimization system then may be trained pursuant to the revised training dataset. The step of obtaining the additional data may include an automated learning mode that includes: analyzing the original training dataset to determine at least one data need; generating a design of experiment for acquiring the data need; monitoring the operation of the gas turbine for determining an opportunity to gather the data need pursuant to the generated design of experiment; and communicating a prompt to the gas turbine when the opportunity to gather the data need is determined. For example, the prompt may describe a change to one of the manipulated variables in accordance with the design of experiment, which then may be implemented by the control system in order to gather the data need for addition to the dataset that is used to train the model.

As another example, per systems described herein, a historical training data database may be included that stores records describing all training data in the original training database. The step of analyzing the original training dataset to determine the data need, i.e., under represented data, may include determining combinations of the manipulated and disturbance variables that: are not included within the historical training data database; or have not been updated in the historical training data database within a predetermined time limit. The step of monitoring the operation of the gas turbine for determining an opportunity to gather the data need may include: determining a combination of the manipulated and disturbance variables associated with current conditions of the operation of the gas turbine; and comparing the combination of the manipulated and disturbance variables associated with the current conditions of the operation of the gas turbine against the combination of the manipulated and disturbance variables associated with the data need. When sufficiently close, the opportunity to gather the data need is determined.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A system comprising:
    a gas turbine having a combustion system;
    a control system operably connected to the gas turbine for controlling an operation thereof; and
    a combustion auto-tuner communicatively linked to the control system, the combustion auto-tuner comprising:
        an optimization system comprising:
            a model, the model comprising an empirical model that models the combustion system via statistically mapping inputs to outputs of an operation of the combustion system so to generate predicted values for the outputs at future times based on the inputs of the combustion system, the model comprising a type of model selected from the following list: a neural network, a support vector machine model, a random forest model, a decision trees model, a k-means model, a principal component analysis model, a gradient boost model, and a parametric equation fitting model; and
            an optimizer;
        sensors configured to measure the inputs and outputs of the operation of the combustion system, the outputs of the combustion system comprising at least one controlled variable, and the inputs of the combustion system comprising disturbance variables and manipulated variables;
        wherein the model comprises a representation of a relationship between (a) the manipulated variables and the disturbance variables and (b) the at least one controlled variable of the combustion system; and
        wherein the optimized control solution for the combustion system comprises a setpoint value for at least one of the manipulated variable;
    a hardware processor; and
    a machine-readable storage medium on which is stored instructions that cause the hardware processor to execute a tuning process for tuning the operation of the combustion system, wherein the machine-readable storage medium comprises instructions that cause the hardware processor to execute a model training process;
    wherein the model training process comprises:
        obtaining additional data for inclusion within an original training dataset in order to create a revised training dataset, the additional data comprising measured values of the inputs and outputs by the sensors during a selected period of operation of the combustion system; and
        training the model of the optimization system pursuant to the revised training dataset;
    wherein the tuning process comprises the steps of:
        receiving current measurements from the sensors for the inputs and outputs;
        given the current measurements received from the sensors, using the optimization system to calculate an optimized control solution for the combustion system; and
        communicating the optimized control solution to the control system; and
    wherein the step of obtaining the additional data comprises an automated learning mode that includes:
        analyzing the original training dataset to determine at least one data need;
        generating a design of experiment for acquiring the at least one data need;
        monitoring the operation of the gas turbine for determining an opportunity to gather the at least one data need pursuant to the generated design of experiment; and
        communicating a prompt to the gas turbine when the opportunity to gather the at least one data need is determined;
        wherein the prompt describes a change to a first one of the manipulated variables in accordance with the design of experiment.

2. The system of claim 1, wherein the model comprises a neural network model; and
    wherein, to calculate the optimized control solution, the optimizer uses the model to predict a future operation of the combustion system in order to minimize a cost function subject to a set of constraints.

3. The system of claim 1, wherein the machine-readable storage medium further comprises a historical training data database in which is stored records describing training data in the original training database;
  wherein the step of analyzing the original training dataset to determine the at least one data need comprises determining combinations of the manipulated and disturbance variables that:
    are not included within the historical training data database; or
    have not been updated in the historical training data database within a predetermined time limit.

4. The system of claim 3, wherein, upon receiving, the control system automatically controls the gas turbine pursuant to the change to the first one of the manipulated variables described by the prompt; and
  wherein the step of monitoring the operation of the gas turbine for determining an opportunity to gather the at least one data need comprises:
    determining a combination of the manipulated and disturbance variables associated with current conditions of the operation of the gas turbine;
    comparing the combination of the manipulated and disturbance variables associated with the current conditions of the operation of the gas turbine against the combination of the manipulated and disturbance variables associated with the at least one data need.

5. The system of claim 1, wherein the optimization system includes a cost function that comprises a mathematical representation for evaluating the future operation of the combustion system relative to one or more operating priorities and the one or more operating constraints of the combustion system; and
  wherein the tuning process further comprises the optimizer determining the setpoint value for the at least one of the manipulated variables by accessing the model to minimize the cost function.

6. The system of claim 5, wherein the optimizer of the optimization system is selected from a group consisting of: linear programming, quadratic programming, mixed integer non-linear programming, gradient descent optimization, stochastic programming, global non-linear programming, genetic algorithms, and particle/swarm techniques;
  wherein the control system automatically controls the gas turbine pursuant to the setpoint value for the at least one of the manipulated variable; and
  wherein the combustion auto-tuner and the optimization system run in a closed loop adjusting the setpoint value of the at least one of the manipulated variables at a predetermined frequency in accordance with an optimization cycle.

7. The system of claim 5, wherein the combustion system comprises a combustor having at least two type of fuel nozzles: a first nozzle and a second nozzle; and
  wherein the disturbance variables include at least one of a load percentage and a compressor inlet temperature.

8. The system of claim 7, wherein the at least one of the manipulated variables includes a fuel split to the combustor that describes how a fuel supply is divided between the first nozzle and the second nozzle.

9. The system of claim 8, wherein the controlled variables comprise at least one of a level of NOx emissions and a level of CO emissions for the gas turbine.

10. The system of claim 8, wherein the controlled variables comprise combustor dynamics.

11. The system of claim 8, wherein the model comprises disturbance rejection;
  wherein the disturbance rejection comprises a configuration of the model in which the predicted value made by the disturbance rejection model for the output at the future time is based upon:
    a predicted value made by the model for the output at the future time; and
    a value of a bias that is based upon an error that the difference between previous corresponding measured and predicted values.

12. The system of claim 8, wherein the empirical model comprises a neural network that includes multiple layers having nodes, the multiple layers including at least an input layer, an output layer, one or more hidden layers, and forward weight matrixes; and
  wherein:
    the input layer comprises a plurality of the nodes, the plurality of the nodes corresponding respectively to the system inputs, wherein each of the plurality of the nodes is configured to receive an input signal relating to a value for a particular one of the system inputs;
    the output layer comprises at least one of the nodes, the at least one of the nodes corresponding to the system output;
    the one or more hidden layers are disposed between the input layer and the output layer, each of the one or more hidden layers comprising a plurality of the nodes; and
    the forward weight matrices comprise connectors that connect the nodes of successive layers of the multiple layers of the neural network and a weight value for each of the connectors;
  wherein a weight vector defines the weight values for the connectors of the forward weight matrices; and
  wherein the bias comprises the error multiplied by the feedback coefficient, and wherein the error comprises a difference between:
    a predicted value made by the neural network of the system output at the previous time; and
    an actual value of the system output at the previous time, wherein the actual value is based upon a measurement taken by a sensor disposed in the combustion system for measuring an operating parameter related to the system output.

13. The system of claim 7, wherein the at least one the manipulated variables comprises a fuel temperature setting of a fuel supply being delivered to at least one of the first nozzle and the second nozzle.

14. The system of claim 7, wherein the at least one of the manipulated variables comprises a setting for the combustion system for at least one of: an overall fuel/air ratio; a bypass air setting; and an inlet guide vane setting.

15. The system of claim 7, wherein the at least one of the manipulated variables comprise at least two of:
  a fuel split to the first and second nozzles;
  an IGV setting; and
  a fuel temperature setting of a fuel supply being delivered to at least one of the first nozzle and the second nozzle;
wherein the controlled variables comprise at least two of:
  a NOx emission level;
  a CO emission level; and
  combustor dynamics.

16. The system of claim 7, wherein the at least one of the manipulated variables comprises a first fuel split bias and a second fuel split bias applicable to the first nozzle and the second nozzle, respectively;

further comprising a fuel splitter that varies how a fuel supply is divided between the first nozzle and the second nozzle in response to a fuel split command from the control system that is based upon the optimized control solution; and wherein the first nozzle and the second nozzle comprise at least two of the following: a primary nozzle; a pilot nozzle; and a downstream injection nozzle; and wherein the controlled variables comprise a level of NOx emissions for the gas turbine.

17. A method for tuning an operation of a combustion system of a gas turbine, wherein a control system of the gas turbine includes an optimization system that comprises: a neural network model that models the combustion system via statistically mapping inputs to outputs of the operation of the combustion system so to generate predicted values for the outputs at future times based on the inputs of the combustion system; and an optimizer;

wherein the method includes performing both a model training process and a combustion tuning process;

wherein the model training process comprises the steps of:

obtaining additional data for inclusion within an original training dataset in order to create a revised training dataset, the additional data comprising measured values of the inputs and outputs by the sensors during a selected period of operation of the combustion system, wherein the step of obtaining the additional data comprises an automated learning mode that includes:

analyzing the original training dataset to determine at least one data need;

generating a design of experiment for acquiring the at least one data need;

monitoring the operation of the gas turbine for determining an opportunity to gather the at least one data need pursuant to the generated design of experiment; and communicating a prompt to the gas turbine when the opportunity to gather the at least one data need is determined;

wherein the prompt describes a change to a first one of the manipulated variables in accordance with the design of experiment that is implemented by the control system; and training the model of the optimization system pursuant to the revised training dataset; wherein the combustion tuning process comprises the steps of:

receiving current measurements from sensors configured to measure the inputs and outputs of the operation of the combustion system;

given the current measurements received from the sensors, using the optimization system to calculate an optimized control solution for the combustion system, wherein, to calculate the optimized control solution, the optimizer accesses the model to predict a future operation of the combustion system in order to minimize a cost function subject to a set of constraints; and via the control system, controlling the gas turbine in accordance with the optimized control solution.

* * * * *